(12) United States Patent
Igaki et al.

(10) Patent No.: US 6,975,408 B2
(45) Date of Patent: Dec. 13, 2005

(54) REFLECTION SCALE AND DISPLACEMENT MEASUREMENT APPARATUS USING THE SAME

(75) Inventors: Masahiko Igaki, Kanagawa (JP); Akio Atsuta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 306 days.

(21) Appl. No.: 10/081,626

(22) Filed: Feb. 20, 2002

(65) Prior Publication Data

US 2002/0122186 A1 Sep. 5, 2002

(30) Foreign Application Priority Data

Feb. 20, 2001 (JP) .......................................... 2001/043262
Feb. 19, 2002 (JP) .......................................... 2002/041739

(51) Int. Cl.[7] .............................. G01B 11/14; G01D 5/34
(52) U.S. Cl. .............. 356/616; 250/231.13; 250/231.18
(58) Field of Search ................................. 356/614–623, 356/499–450; 250/231.13, 231.16, 231.18, 237 G, 231.14

(56) References Cited

U.S. PATENT DOCUMENTS

| | | | | |
|---|---|---|---|---|
| 4,983,825 A | * | 1/1991 | Ichikawa et al. | 250/231.16 |
| 5,057,686 A | * | 10/1991 | Hikawa et al. | 250/231.16 |
| 5,204,524 A | * | 4/1993 | Ichikawa et al. | 250/237 G |
| 5,534,693 A | * | 7/1996 | Kondo et al. | 250/237 G |
| 5,909,283 A | * | 6/1999 | Eselun | 356/499 |
| 6,654,128 B2 | * | 11/2003 | Takayama et al. | 356/499 |
| 6,713,756 B2 | * | 3/2004 | Yamamoto et al. | 250/231.13 |
| 2002/0000515 A1 | * | 1/2002 | Takayama et al. | 250/231.16 |

* cited by examiner

*Primary Examiner*—Hoa Q. Pham
(74) *Attorney, Agent, or Firm*—Morgan & Finnegan, LLP

(57) ABSTRACT

This invention realizes a detection system which serves as a displacement measurement apparatus for optically detecting a relative position, improves the use efficiency of a light amount, and is resistant to mechanical variations. More specifically, in an optical sensor having a light source, a reflector for reflecting a divergent light beam from the light source, and a light-receiving portion for receiving a reflected light beam from the reflector. The reflector has an optical characteristic that a divergent light beam from the light source is wavefront-split into a plurality of beams and the respective split light beams are overlaid at a predetermined position.

28 Claims, 35 Drawing Sheets

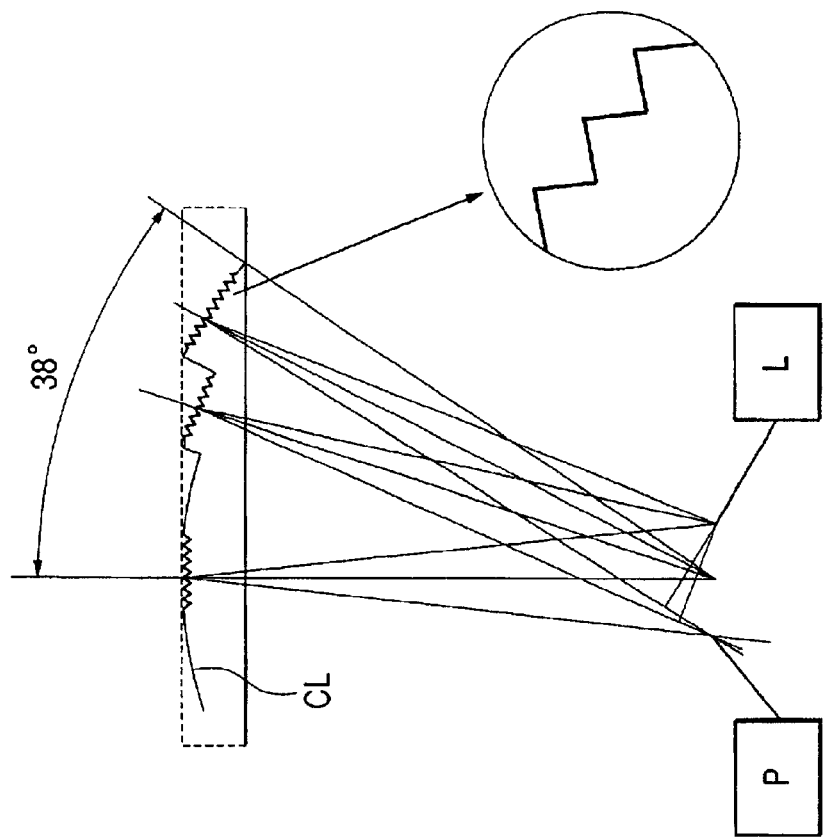
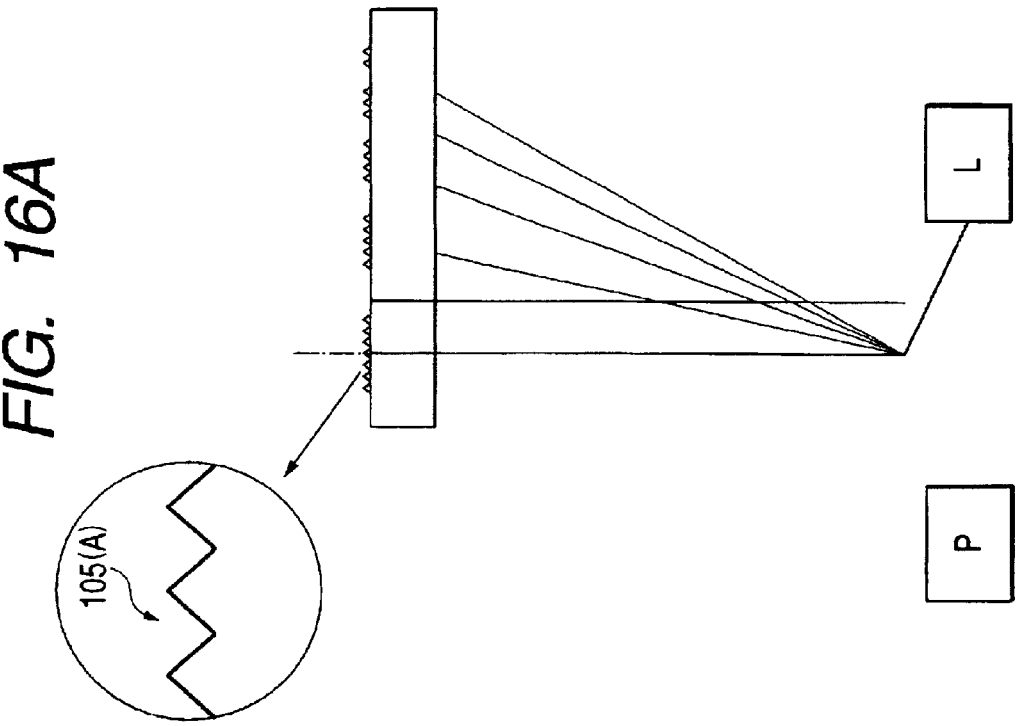

FIG. 23A
FIG. 23C
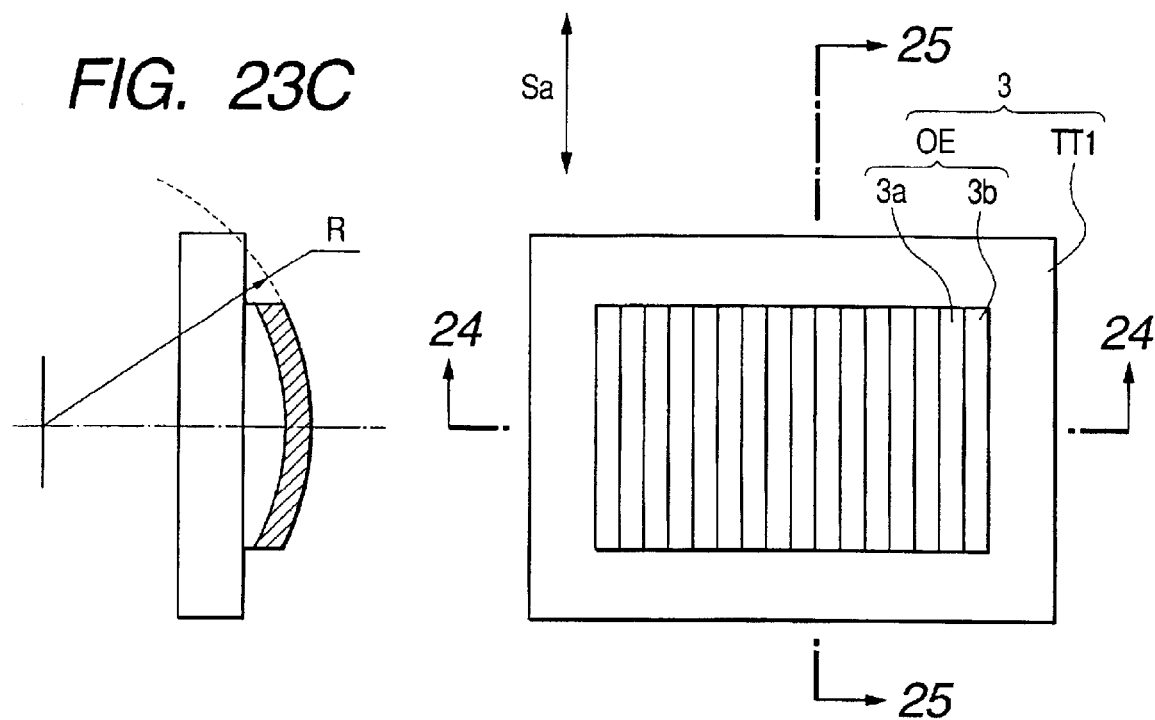
FIG. 23B
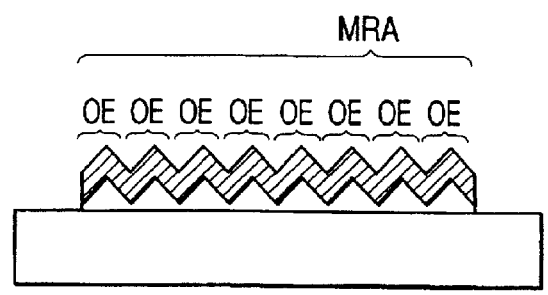

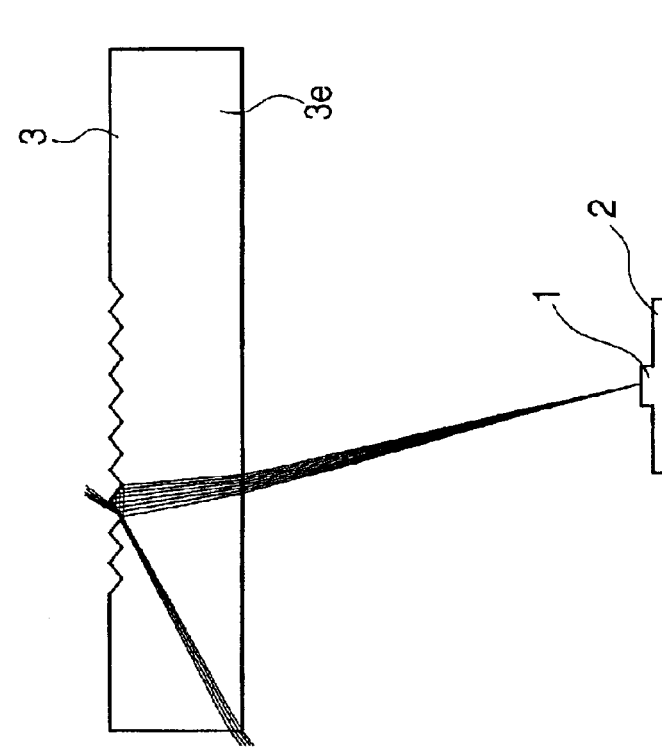
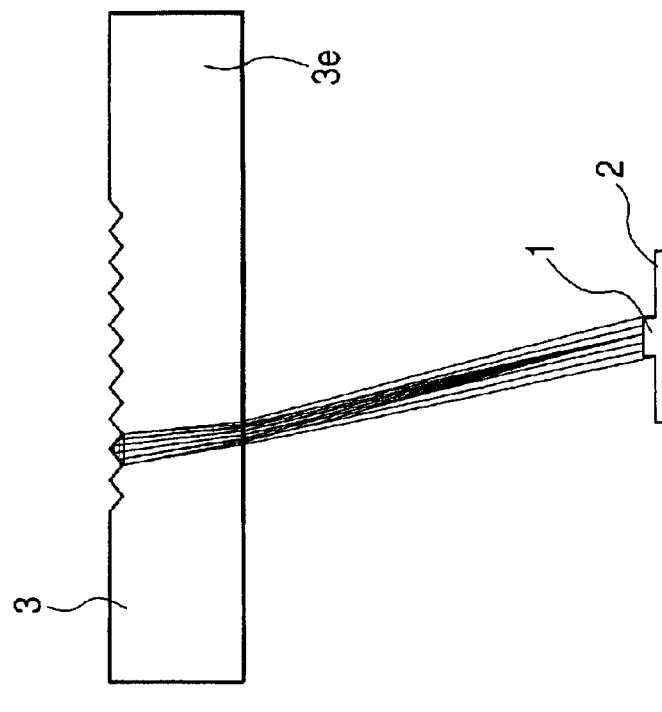

REFLECTION SCALE AND DISPLACEMENT MEASUREMENT APPARATUS USING THE SAME

BACKGROUND OF THE INVENTION

1. Field of the Invention

The present invention relates to a reflector and a displacement measurement apparatus using the reflector and, more particularly, to a reflector suitably used as a reflection beacon member (reflection target member), or reflection optical scale used for a photoreflector (photosensor), reflection encoder, or optical measurement device, or the like which includes a light source and light-receiving means and is used to detect the presence/absence of an object or a change in the object. In addition, the present invention relates to a displacement measurement apparatus such as a linear encoder or rotary encoder which detects displacement information such as a moving amount or moving speed by using an optical scale using the reflector.

2. Related Background Art

Various conventional photosensors using reflected light and encoders using the photosensors will be described with reference to FIGS. 46 and 47.

FIG. 46 is a schematic view of a reflection photosensor (photoreflector). FIG. 47 shows a photoreflector with a lens. FIGS. 48A to 48C show the edge response measurement arrangement (FIG. 48A) and characteristics (FIGS. 48B and 48C) of the photoreflector with the lens in FIG. 47. FIG. 48A shows a photosensor PS.

The arrangement shown in FIG. 47 includes a light source (LED) 101, a light-receiving portion (photodiode or phototransistor) 102, lenses 103 and 104, a detection object 105 for the detection of movement information or a displacement measurement target (reflection object 105), an aluminum reflection film 105a, a nonreflection portion 105c, and a substrate 105b.

The reflection sensor PS shown in FIG. 47 irradiates the measurement/observation target (reflection object) 105 with a light beam from the light source 101 and detects a light beam from the reflection object 105 by using the light-receiving means 102, thereby determining/measuring the presence/absence of the reflection object 105, a difference in reflectance, and the difference between reflection and non-reflection (or absorption). A special reflection target is mounted on the measurement/observation object 105, as needed.

FIG. 49 shows an arrangement which can detect the movement information of the moving object 105 with high precision and resolution. A so-called reflection optical encoder or the like used, in which light from a reflection scale 105d obtained by periodically arraying reflection slits formed by reflection portions 105a and nonreflection portions 105c at a small pitch is detected by the light-receiving means 102 to count the number of bright and dark patterns of the reflection slits, thereby measuring the displacement of the moving object 105.

Various sensors and apparatuses are available, which irradiate the object 105 serving as a measurement or observation target with a light beam from the light source 101, and receive reflected light from a reflection target or reflection scale 105d mounted on the object 105 by using the light-receiving means 102, thereby detecting the presence/absence of the object or its moving state.

The above reflection sensor, the reflection target irradiated with a light beam from a light source in a reflection optical measurement apparatus or the like, and the reflector 105 having a reflection scale utilize the presence/absence of reflected light from a reflector, a difference in reflectance on the reflector, the difference between reflection and nonreflection (or absorption) on the reflector, and the like.

In general, a reflector uses an aluminum reflection film or metal reflection member at a desired reflection portion serving as a measurement/observation target. Alternatively, the surface of a reflection portion is formed by a mirror surface, and the surface of a nonreflection portion is roughened into a diffusion surface or the like.

FIG. 48B shows the relationship between the distance between the photosensor PS and the reflector 105 and the output current from the light-receiving element. FIG. 48C shows the relationship between an edge response characteristic, i.e., the edge migration distance of the reflector 105, and the output current from the light-receiving element.

A reflector that has an aluminum reflection film on a desired reflection portion serving as a measurement or observation target on an object to improve the reflectance is an effective means for detecting movement information because a sufficiently large reflected light intensity difference can be set between the reflection portion and the nonreflection portion. However, it is difficult to form an aluminum deposition film as a reflector on a substrate. In addition, in a high temperature/high humidity environment, the aluminum film tends to peel off. This poses a problem in terms of reliability.

Furthermore, when an aluminum reflection film is used as a reflector, a high reflectance can be expected, and a sufficiently larger reflectance difference can be realized between a reflection portion and a nonreflection portion. If, however, it is combined with the conventional reflection photosensor shown in FIG. 47, the reflector cannot guide a sufficient amount of light beam to the light-receiving element 102 when the light beam is returned to the light source side. Therefore, this arrangement tends to lack in absolute light amount. If this problem is to be avoided by increasing (enhancing) the emission intensity of the light source 101, the power consumption of the light source increases.

In the photosensor PS shown in FIG. 47, in order to solve such problems, the lens 103 is placed on the light source 101 side to increase the light irradiation intensity for the reflector 105 per unit area, and the lens 104 is also placed on the light-receiving portion 102 side to guide a widely divergent light beam reflected by the reflector 105 to the small light-receiving surface.

In the reflection sensor having lenses mounted on the light-emitting portion 101 and light-receiving portion 102, respectively, the photosensor PS must be assembled while the ideal positional relationship geometrically/optically determined by the light-emitting element 101, lenses 103 and 104, reflector 105, and light-receiving element 102 is maintained. In addition, in the combination of the reflector 105 and the photosensor PS, in order to obtain a high optical transmission efficiency between light emission and light reception, the reflection posture (reflection angle, the distance from the sensor, and the like) of the reflector 105 must be maintained to a predetermined positional relationship with high precision. The thickness of the photosensor PS itself increases due to the use of lenses. This hinders reductions in the size and thickness of the apparatus.

SUMMARY OF THE INVENTION

It is an object of the present invention to provide a reflector and an optical apparatus such as an encoder using the reflector, which can obtain a high optical transmission efficiency by properly forming a reflection element to be mounted on a reflector serving as a measurement/observation target without using any lenses for a photosensor, realize a system insensitive to a relative position shift between the reflector and the photosensor, and can detect the presence/absence of the reflector or its moving state with high precision.

In one aspect of the invention, a displacement detecting apparatus comprises:

an illumination system which applies a divergent light beam from a light-emitting device to the reflection scale provided on a measurement object which relatively moves;

said reflection scale which guides the light beam applied by said illumination system to a direction different from said illumination system by at least two reflections; and a light sensing device which detects an amount of a light beam reflected by said reflection scale.

In further aspect of the foregoing apparatus, said reflection scale has an optical function of wavefront-splitting the divergent light beam from said illumination system into a plurality of light beams and overlaying the plurality of wavefront-split light beams at a predetermined position.

In further aspect of the foregoing apparatus, said reflection scale has an optical function of wavefront-splitting the divergent light beam from said illumination system into a plurality of light beams and overlaying the plurality of wavefront-split light beams on a detection surface of said light sensing device.

In further aspect of the foregoing apparatus, said reflection scale is a roof type reflection element formed by opposing two reflection surfaces at a predetermined angle.

In further aspect of the foregoing apparatus, said reflection scale has a plurality of roof type reflection elements, each identical to said roof type reflection element, arrayed in a predetermined direction.

In further aspect of the foregoing apparatus, said reflection scale having said plurality of roof type reflection elements, each identical to said roof type reflection element, arrayed in the predetermined direction is formed by a metal reflection surface, and a reflection area thereof is a surface reflection type mirror.

In further aspect of the foregoing apparatus, said reflection scale having said plurality of roof type reflection elements is formed by a metal reflection surface, and a reflection area thereof is a surface reflection.

In further aspect of the foregoing apparatus, said reflection scale having said plurality of roof type reflection elements is an internal reflection type mirror made of a transparent material, and has cylindrical surfaces on the light beam incident and exit surface sides.

In further aspect of the foregoing apparatus, said reflection scale having said plurality of roof type reflection elements is formed such that all angles defined by reflection surfaces are equal to each other.

In further aspect of the foregoing apparatus, said reflection scale having said plurality of roof type reflection elements is formed such that angles defined by reflection surfaces continuously increase/decrease from a central portion to a peripheral portion in an array direction of said roof type reflection elements in said reflection scale.

In further aspect of the foregoing apparatus, said reflection scale has a plurality of roof type reflection elements, each identical to said roof type reflection element, discontinuously arrayed in a moving direction.

In further aspect of the foregoing apparatus, said reflection scale has a plurality of roof type reflection elements, each identical to said roof type reflection element, discontinuously arrayed in a moving direction, and a discontinuous portion has a substantially nonreflection characteristic.

In further aspect of the foregoing apparatus, said reflection scale is formed such that a ridge formed by joining surfaces of said roof type reflection elements forms part of an arc or ellipse.

In further aspect of the foregoing apparatus, said reflection scale having said plurality of roof type reflection elements is formed by a metal reflection surface, and a reflection area thereof is a surface reflection type mirror.

In further aspect of the foregoing apparatus, said reflection scale having said plurality of roof type reflection elements is an internal reflection type mirror made of a transparent material, and has cylindrical surfaces on the light beam incident and exit surface sides.

In further aspect of the foregoing apparatus, said reflection scale is formed such that an envelope surface formed by ridges formed by joining surfaces of said roof type reflection elements forms part of a spherical surface.

BRIEF DESCRIPTION OF THE DRAWINGS

FIGS. 16A and 16B are views showing reflection scales according to other embodiments of the present invention;

FIGS. 23A, 23B and 23C are a plan view and side views showing the linear encoder scale in FIG. 22 when viewed from the direction of the optical axis of a light source;

FIGS. 41A and 41B are schematic views showing the optical paths of a reflector according to the present invention;

DETAILED DESCRIPTION OF THE PREFERRED EMBODIMENTS

Figure 1:
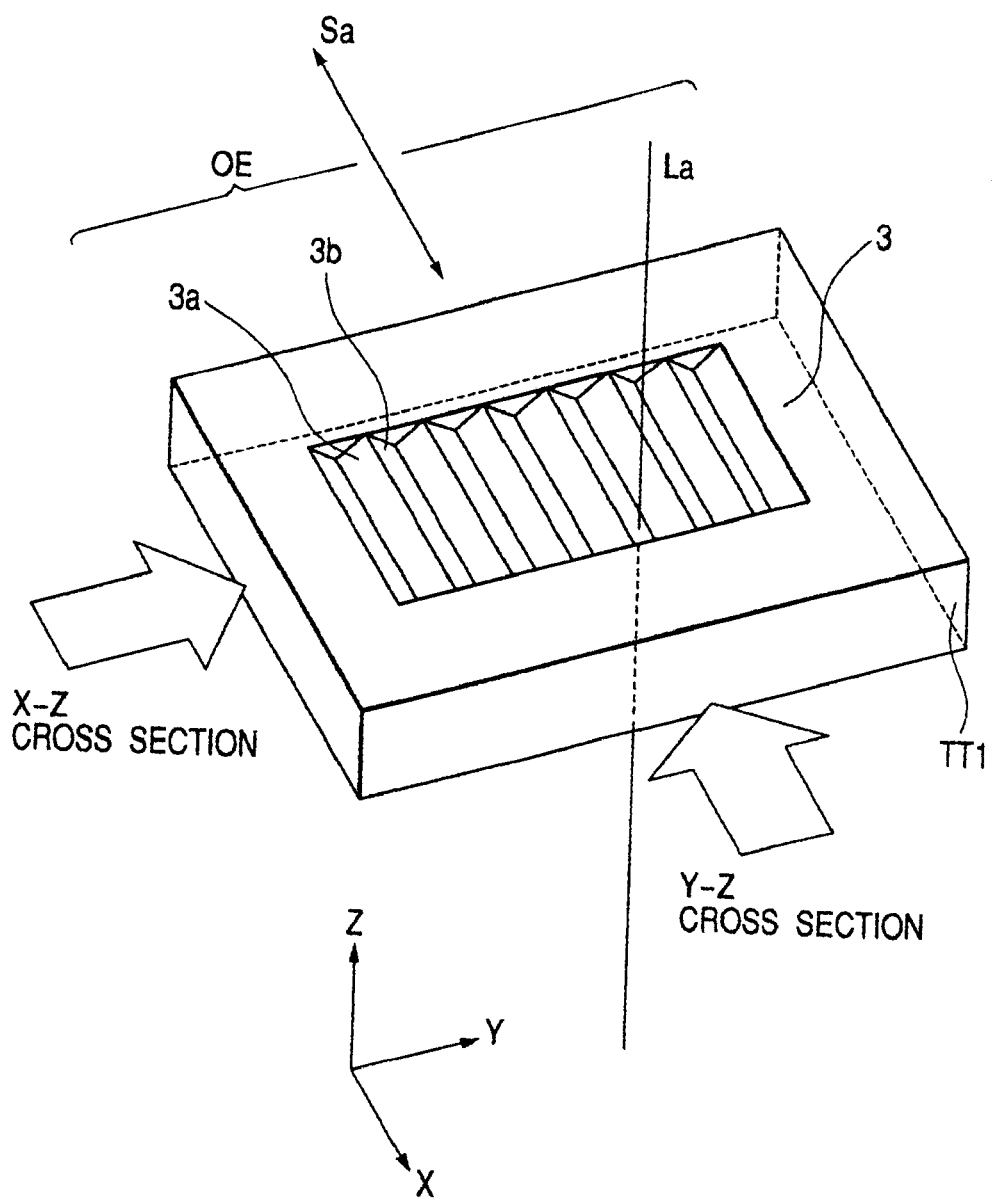
FIG. 1 is a perspective view showing a reflection element having a one-dimensional convergence characteristic according to the first embodiment of the present invention.

FIG. 1 is a perspective view showing the main part of a reflector (reflection element) having a one-dimensional convergence characteristic according to the first embodiment of the present invention.

The reflector of this embodiment can be used for a measurement/observation target object as reflection beacon target or encoder serving as a photoreflector irradiated with a light beam from a light source. Referring to FIG. 1, a reflector 3 (reflection scale) includes a reflection means OE having a one-dimensional convergence characteristic according to the present invention. In this embodiment, the reflection means OE is a plurality of V-shaped grooves (OE) located almost at the center in FIG. 1. The reflector 3 includes two inclined surfaces 3a and 3b forming V-shaped grooves. The substrate of the reflector 3 on which this reflection element OE is formed is made of a transparent member TT1, which is made of a transparent resin such as polymethyl methacrylate (PMMA), polycarbonate (PC), or PCPD-based transparent heat-resistant resin (heat resistance equivalent to a thermal deformation temperature of 170° C.).

The reflector of the present invention is formed by mounting, on the surface of a transparent substrate (transparent resin), a reflection means (micro roofmirror array) having a plurality of roofmirrors, each having two reflection surfaces 3a and 3b opposed at a predetermined angle (85° or 95°), arrayed in a one-dimensional direction.

As this roofmirror surface, an optical effect based on the total internal reflection of a transparent resin or a metal mirror reflection surface may be used.

The reflector of the present invention can be used as a beacon portion for an origin signal for an encoder or a beacon portion for generating a commutation signal for a motor control encoder.

In addition, this reflector can be used as the reflection surface of a Fresnel zone plate and can be used as an encoder scale.

The optical effect of the reflector according to the present invention will be described first in comparison with the conventional reflector.

Figure 49:
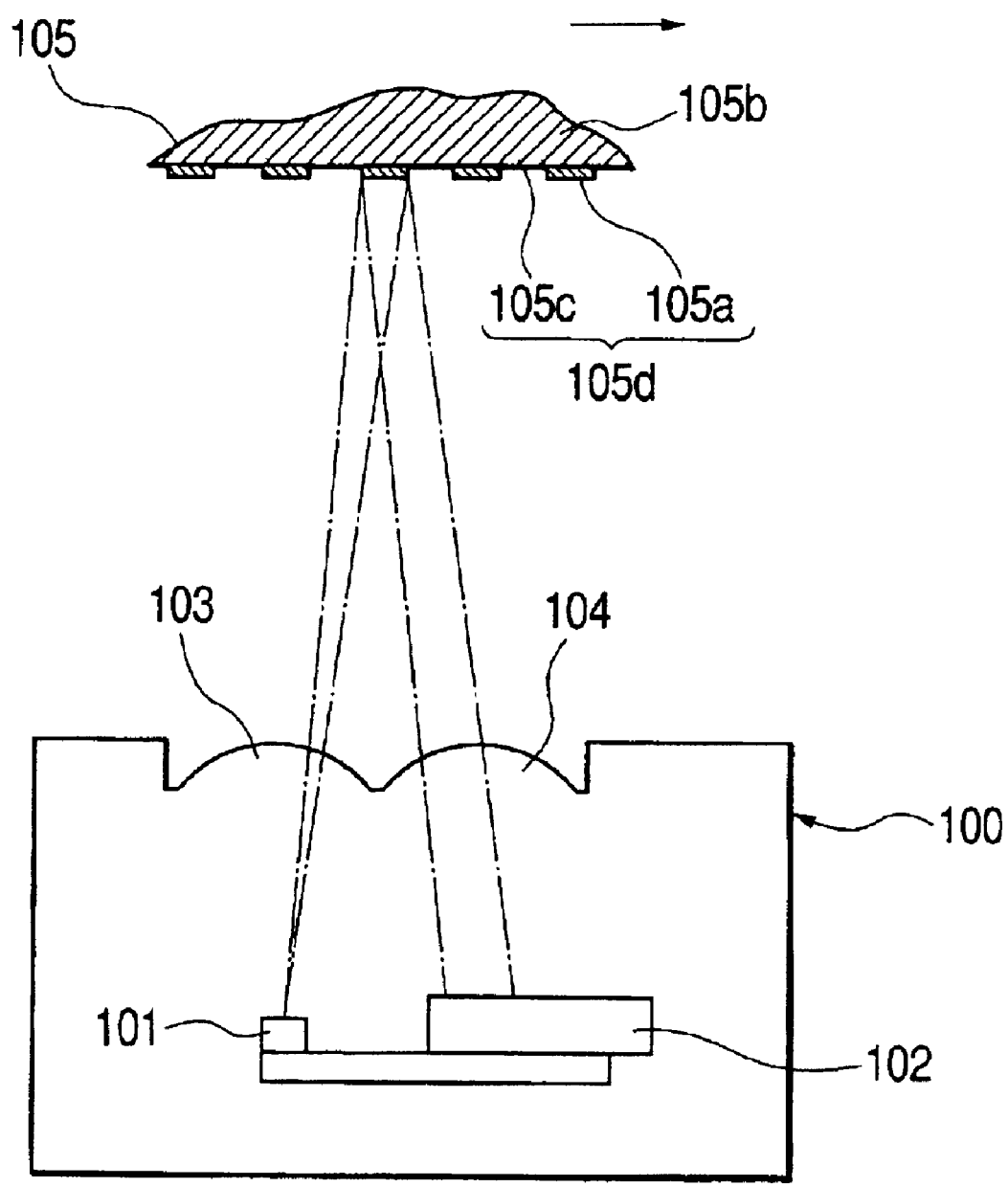
FIG. 49 is a view showing a conventional lens reflection encoder.

FIG. 49 is a view for explaining a conventional reflector 105.

FIG. 49 shows a state where a divergent light beam from a light source 101 is incident on the reflector 105d, reflected by a reflection surface 105a formed by a flat surface, and guided to a light-receiving portion 102 while the divergence angle of the light beam is maintained unchanged.

Figure 38A:
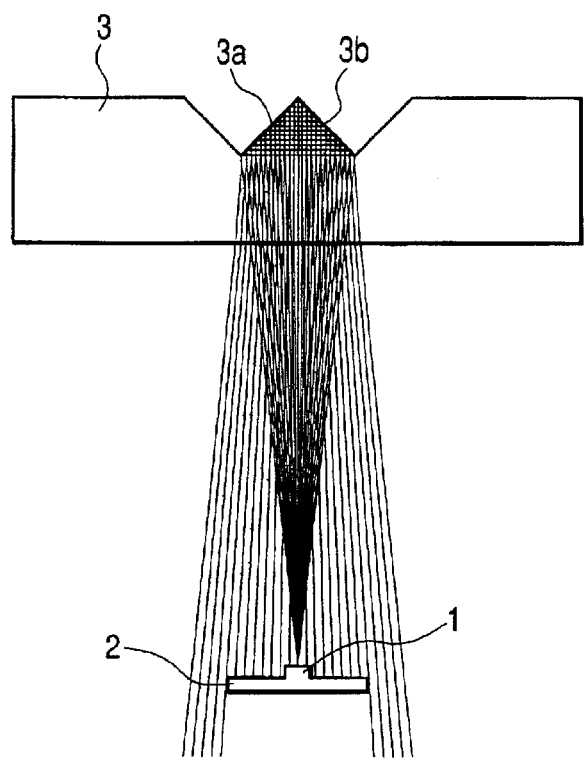
FIGS. 38A, 38B, and 38C are views for explaining the optical paths of a reflector according to the present invention.
Figure 38B:
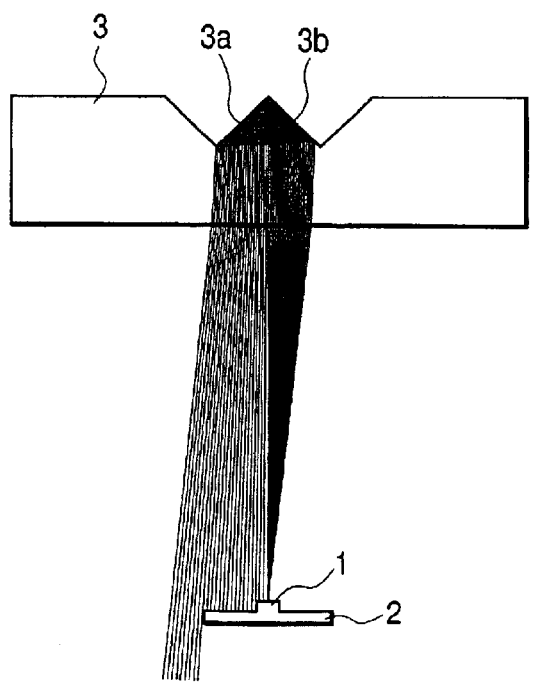
Figure 38C:
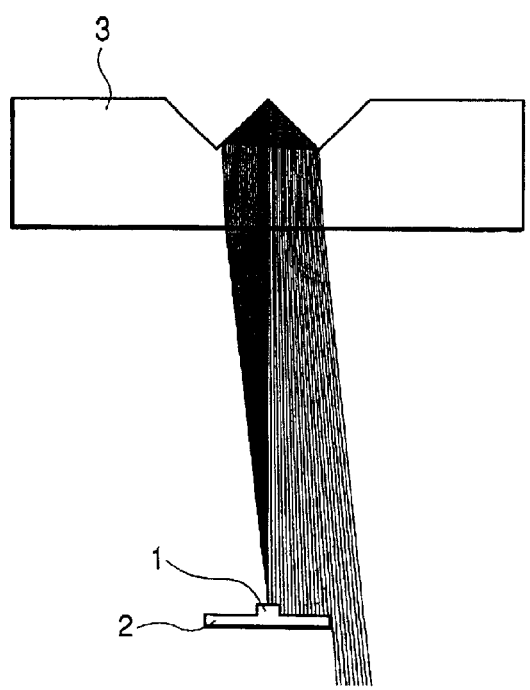

FIGS. 38A, 38B, and 38C are optical path diagrams showing a case where one roofmirror is used for the reflector 3. FIGS. 38A, 38B, and 38C show an arrangement in which a light beam is reflected by one roofmirror having two reflection surfaces 3a and 3b opposed at a predetermined angle.

Figure 47:
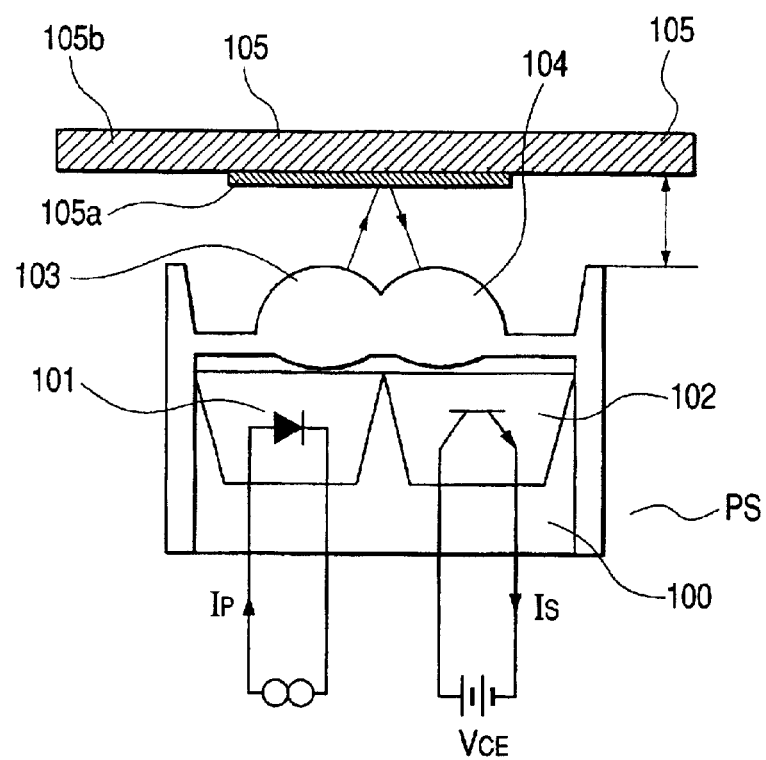
FIG. 47 is a view showing a conventional reflection sensor with a lens and a conventional photoreflector.
Figure 48A:
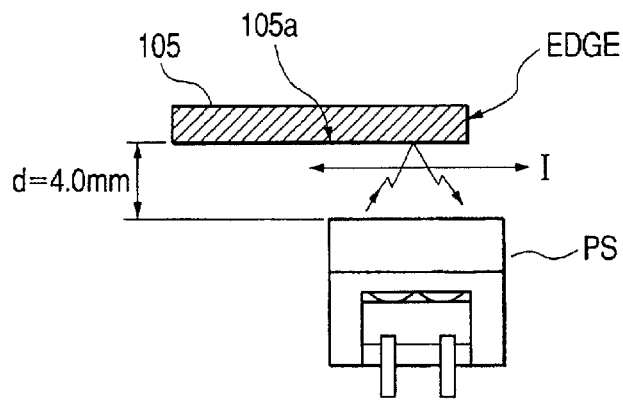
FIGS. 48A, 48B and 48C are views showing the characteristics of the conventional reflection sensor and photoreflector in FIG. 12.
Figure 48B:
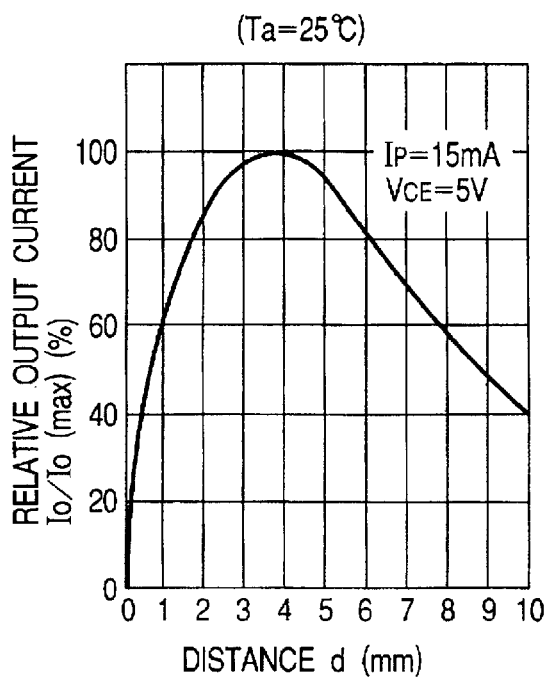
Figure 48C:
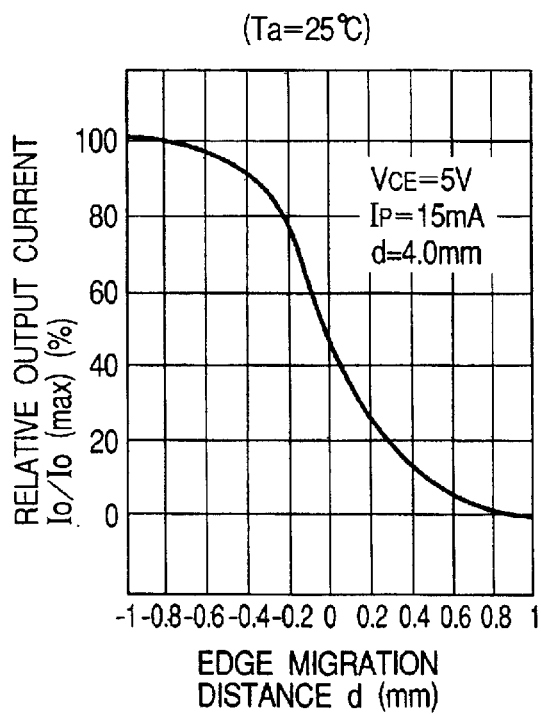

Referring to FIG. 38A, the light beam omnidirectionally emitted from the light source 1 is guided to the light-receiving portion 2 with a divergence angle almost equal to that shown in FIG. 47.

The divergent light beam from the light source 1 is split by the reflection surfaces 3a and 3b, and the split light beams travel toward the light-receiving portion 2 without overlapping.

FIGS. 38B and 38C show that the divergent light beam emitted from the light source 1 is split into two light beams.

Referring to FIGS. 38B and 38C, the divergent light beam emitted from the light source 1 to one side is split by the reflection surfaces 3a and 3b constituting the roofmirror.

Referring to FIG. 38B, for example, the light beam emitted from the light source 1 to the right is guided to the left of the light-receiving portion 2. The light beam is split by the roofmirror, and the split light beams travel toward the light-receiving portion 2 without overlapping.

Figure 39:
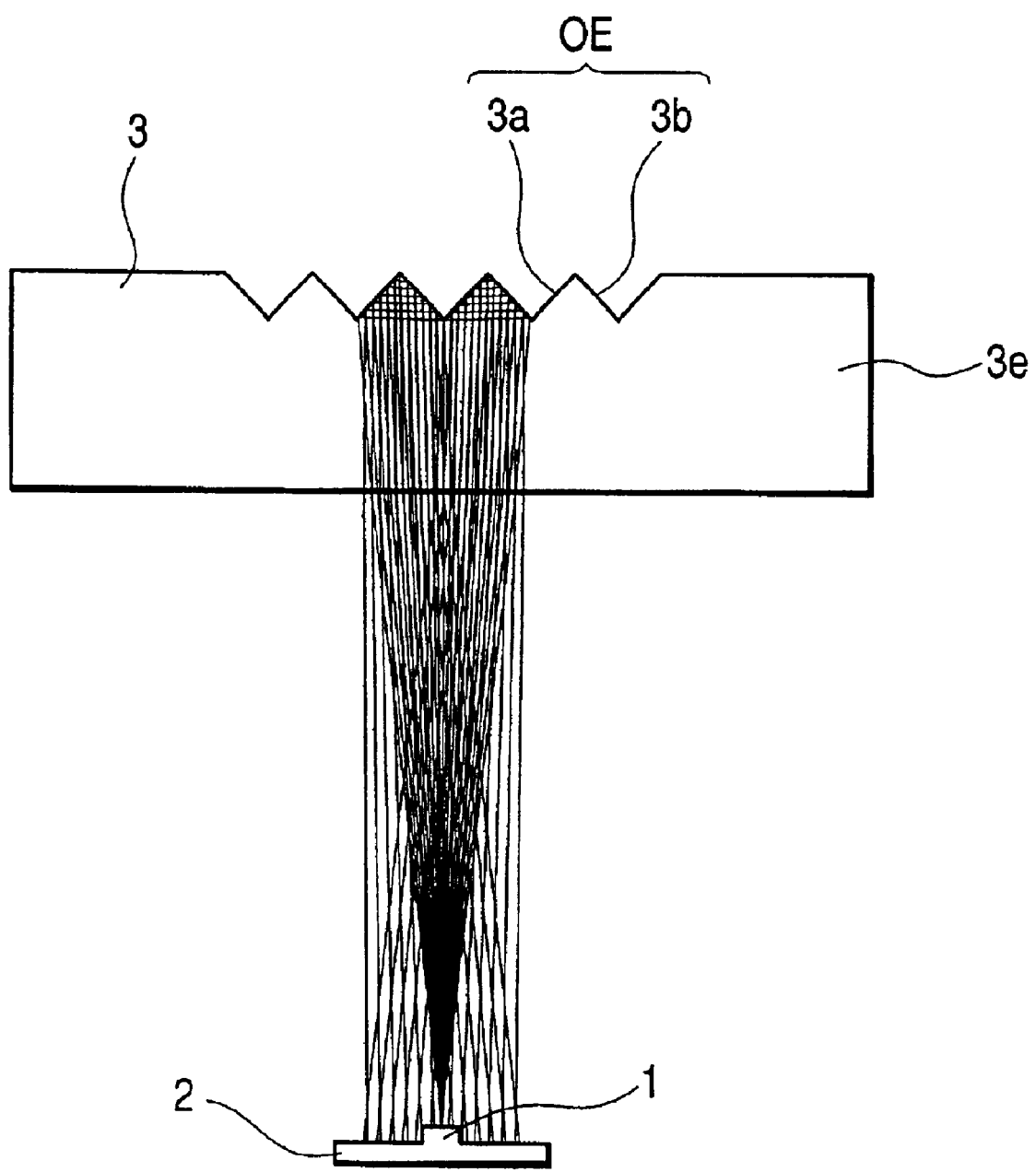
FIG. 39 is a schematic view showing the optical paths of a reflection according to the present invention.
Figure 40A:
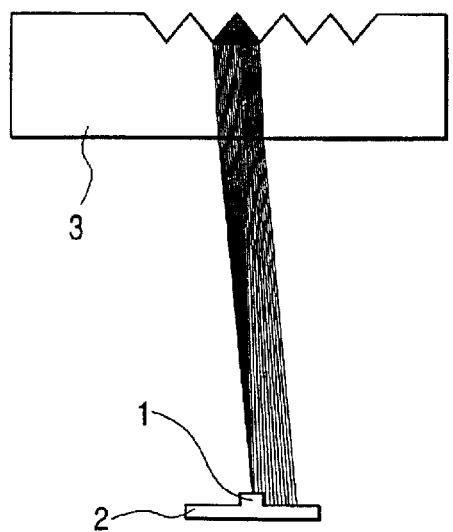
FIGS. 40A, 40B, 40C and 40D are schematic views showing the optical paths of a reflector according to the present invention.
Figure 40B:
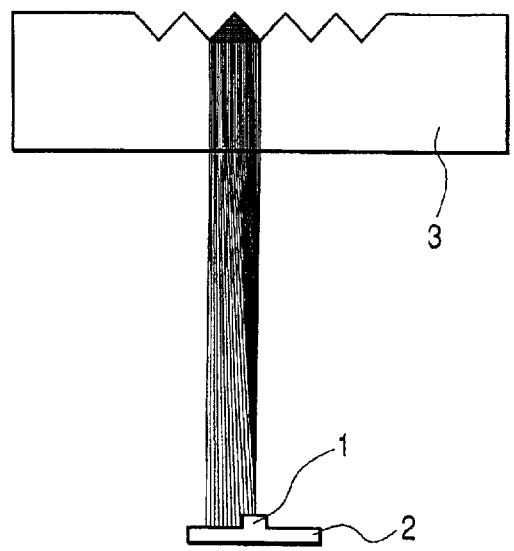
Figure 40C:
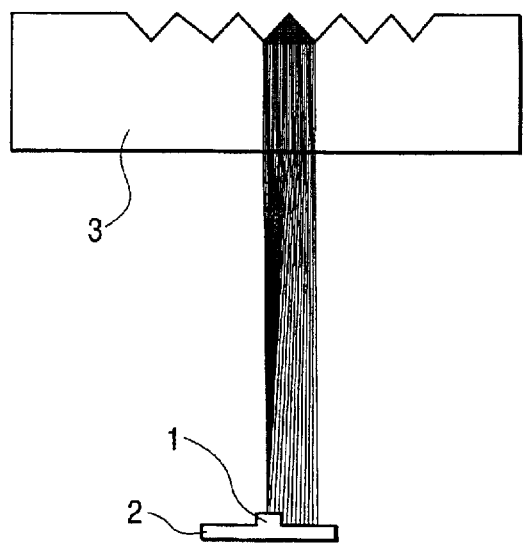
Figure 40D:
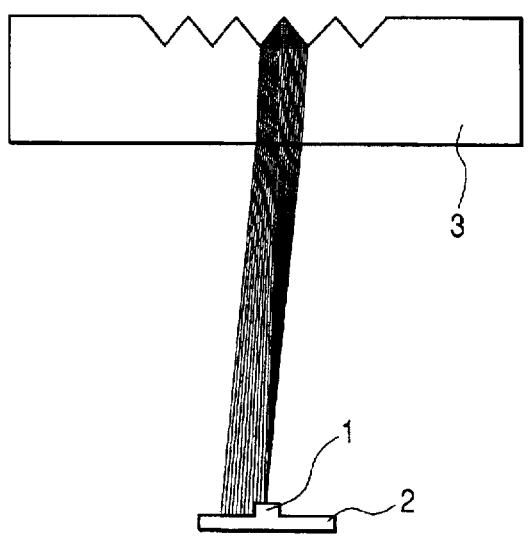

FIG. 39 is a view for explaining the optical effect of the reflector 3 according to the present invention.

The reflection means OE obtained by arraying a plurality of roofmirrors, each having two reflection surfaces 3a and 3b opposed at a predetermined angle, in a one-dimensional direction is formed on one surface of a transparent substrate 3e.

A divergent light beam from the light source 1 is reflected by the reflection means OE of the reflector 3, and the resultant light beams overlap each other at an arbitrary position (light-receiving portion 2 or its nearby portion).

A divergent light beam from the light source 1 almost remains within the surface of the light-receiving portion 2, and the light beam emitted from the light source 1 at a divergence angle remains within the surface of the light-receiving portion 2, thereby increasing the ray density of a light beam on the surface of the light-receiving portion 2.

FIGS. 40A to 40D show a state where a light beam diverging from the light source 1 in various directions is incident on the reflector 3 to be split into a plurality of light beams by a plurality of roofmirrors and reflected by the roofmirrors, and the light beams reflected by the respective roofmirrors overlap each other at an arbitrary position (light-receiving portion 2 or its nearby portion).

In any case, reflected light beams from the reflector 3 overlap each other at the light-receiving portion 2 or its nearby portion.

A light beam is split by each inclined surface of each roofmirror. The reflected light beams in FIGS. 40A and 40D overlap on the surface of the light-receiving portion 2, and the reflected light beams in FIGS. 40B and 40C overlap in the same areas on the surface of the light-receiving portion 2 as those shown in FIGS. 40A and 40D.

FIGS. 41A and 41B are views for explaining a difference in ray action due to the difference in refractive index between materials for transparent members each serving as the substrate of the reflector 3.

FIG. 41A shows a case where the material for the transparent member 3e has a refractive index of 1.69. FIG. 41B shows a case where the material has a refractive index of 1.53.

As the refractive index of a material increases, the critical angle decreases, and total reflection occurs. For this reason, the requirement on ray incident angle is relaxed. In this embodiment, the reflector uses a transparent member having a high refractive index (1.65 or more) to improve the use efficiency of light.

FIGS. 42A to 43C are views showing how the focused state of reflected light beams changes depending on the number of roofmirrors constituting a reflection means.

Figure 42A:
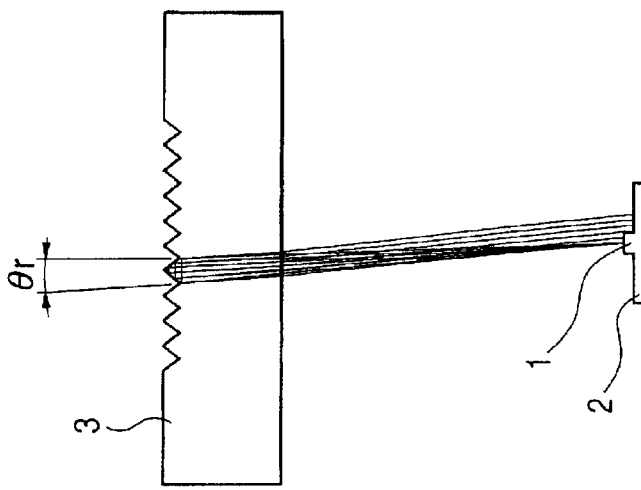
FIGS. 42A, 42B and 42C are schematic views showing the optical paths of a reflector according to the present invention.
Figure 42B:
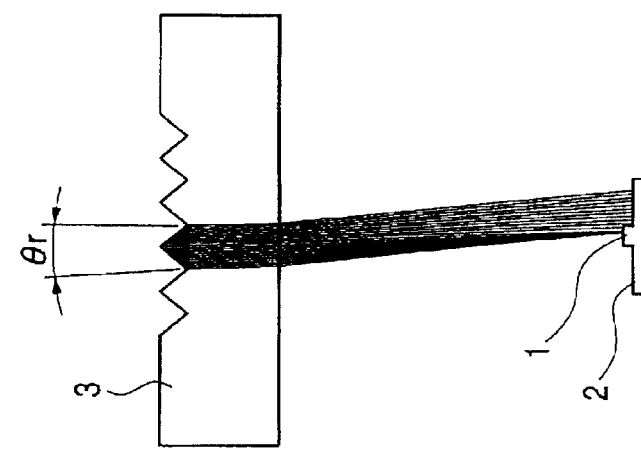
Figure 42C:
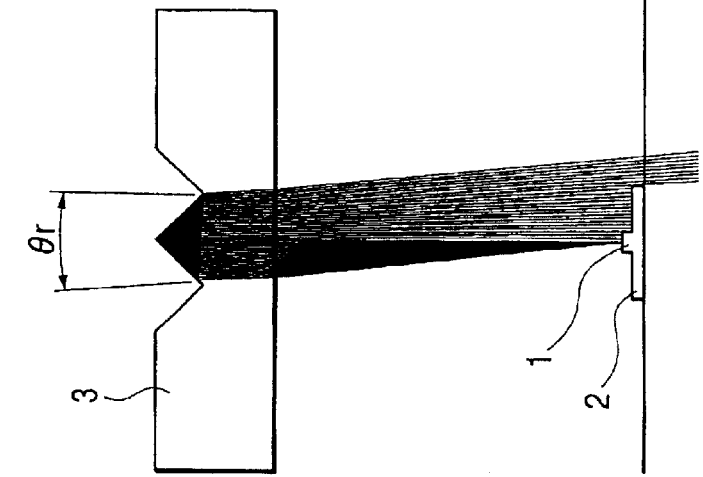

Referring to FIGS. 42A to 42C, as the number of roofmirrors increases, the angle ($\theta r$) of each inclined surface serving as a reflection surface with respect to the light source 1 decreases, and the light amount of each of split light beams decreases. At the same time, since the light beam is guided to the surface of the light-receiving portion 2, the area on the surface of the light-receiving portion which is irradiated with the reflected light beam decreases.

An increase in the number of roofmirrors cancels out a decrease in light amount, while the total light amount remains unchanged. Only the effect of decreasing the irradiation area on the surface of the light-receiving portion 2 remains effective.

Figure 43A:
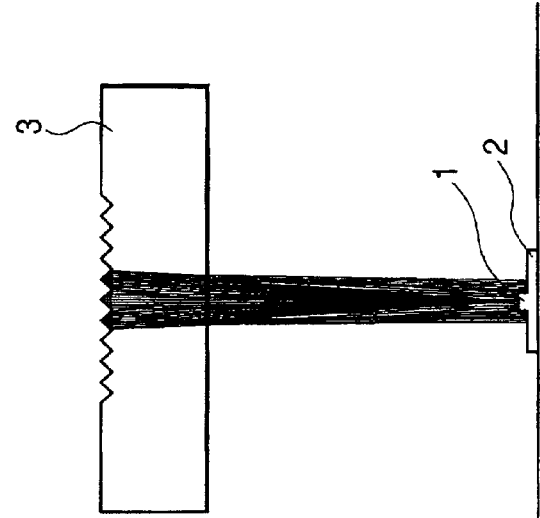
FIGS. 43A, 43B and 43C are schematic views showing the optical paths of a reflector according to the present invention.
Figure 43B:
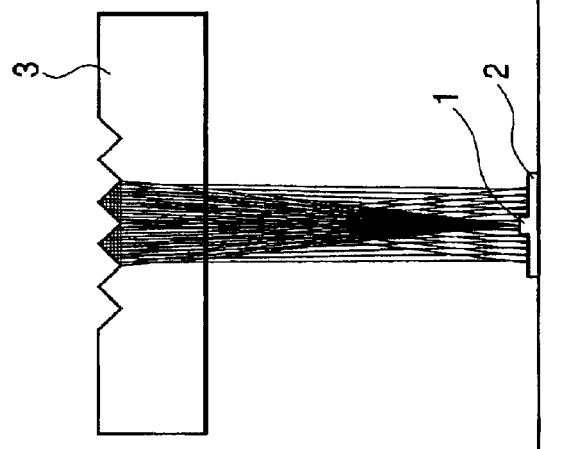
Figure 43C:
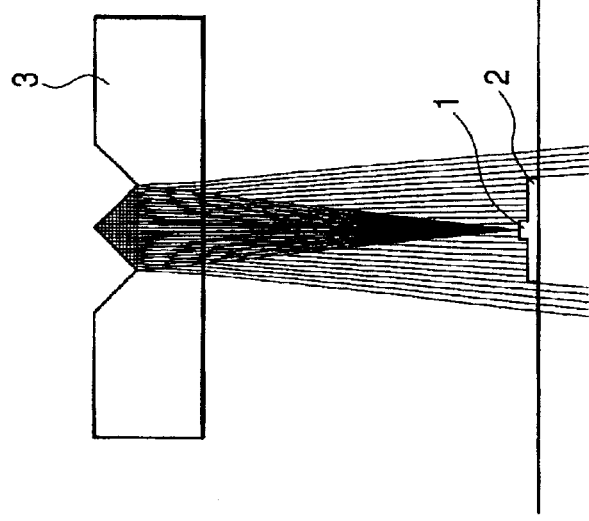

FIGS. 43A to 43C show a case where light beams emitted from the light source 1 at the same divergence angle are incident on the reflector 3, with the same distance from the light source 1. Referring to FIGS. 43A to 43C, the ray density of the light beam guided onto the surface of the light-receiving portion 2 increases as the pitch of roofmirrors decreases.

The reflector of the present invention is based on the above principle.

The optical effect of the reflection element (reflector) having a one-dimensional convergence characteristic according to the first embodiment of the present invention will be described next with reference to FIG. 1.

A light beam (not shown) from a light source as a part of a photosensor strikes the reflector 3 from below (the surface opposing the surface on which the V-shaped grooves are formed), and the light beam travels in the transparent member TT1. The light beam that has reached a V-shaped groove portion is totally reflected twice owing to the effect of total internal reflection and returns to the light source side of the photosensor to be guided to a sensor light-receiving portion serving as a part of the photosensor. Referring to FIG. 1, reference character Sa denotes a displacement direction of the reflector 3. However, the present invention is not limited to this direction (X-axis direction), and the movement of the reflector 3 can be detected in the Y-axis direction perpendicular to the direction Sa or another direction included in an X-Y plane.

(Second Embodiment)

Figure 2:
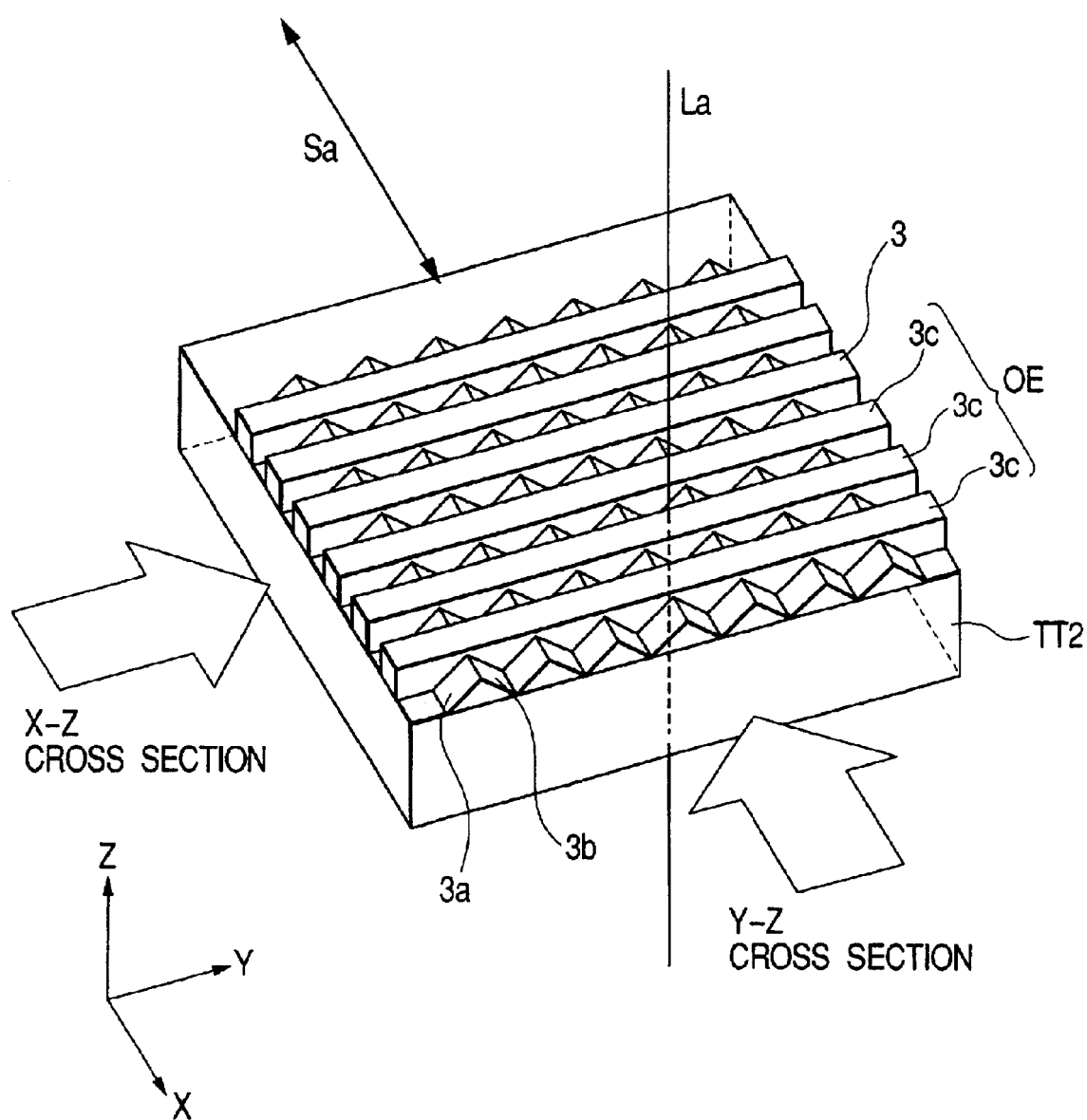
FIG. 2 is a perspective view showing a reflection element having a one-dimensional convergence characteristic according to the second embodiment of the present invention, which is used as a linear encoder scale.

FIG. 2 is a perspective view showing the main part of a reflector according to the second embodiment of the present invention.

In the second embodiment, a reflection means having a one-dimensional convergence characteristic is applied to part of a reflector 3 serving as a scale for a reflection linear encoder. As in the first embodiment described above, in this embodiment, the reflection portion of the reflector 3 is formed by a plurality of continuous V-shaped grooves. The optical reflecting action is the same as that of the total internal reflection in a transparent member.

A "V-shaped groove group" OE having a plurality of V-shaped grooves continuously arrayed is used as a reflection means serving as an integral optical element.

This embodiment differs from the first embodiment in that a plurality of V-shaped groove groups OE, instead of one, are periodically arranged along a reflector substrate surface TT2 in a moving direction Sa.

Referring to FIG. 2, a normal La to the light-emitting surface of a light source in a reflection encoder (not shown) coincides with the principal ray of the light beam emitted from the light source onto the reflector 3, and this principal ray crosses the reflection scale (reflector 3) almost perpendicularly.

Figure 3:
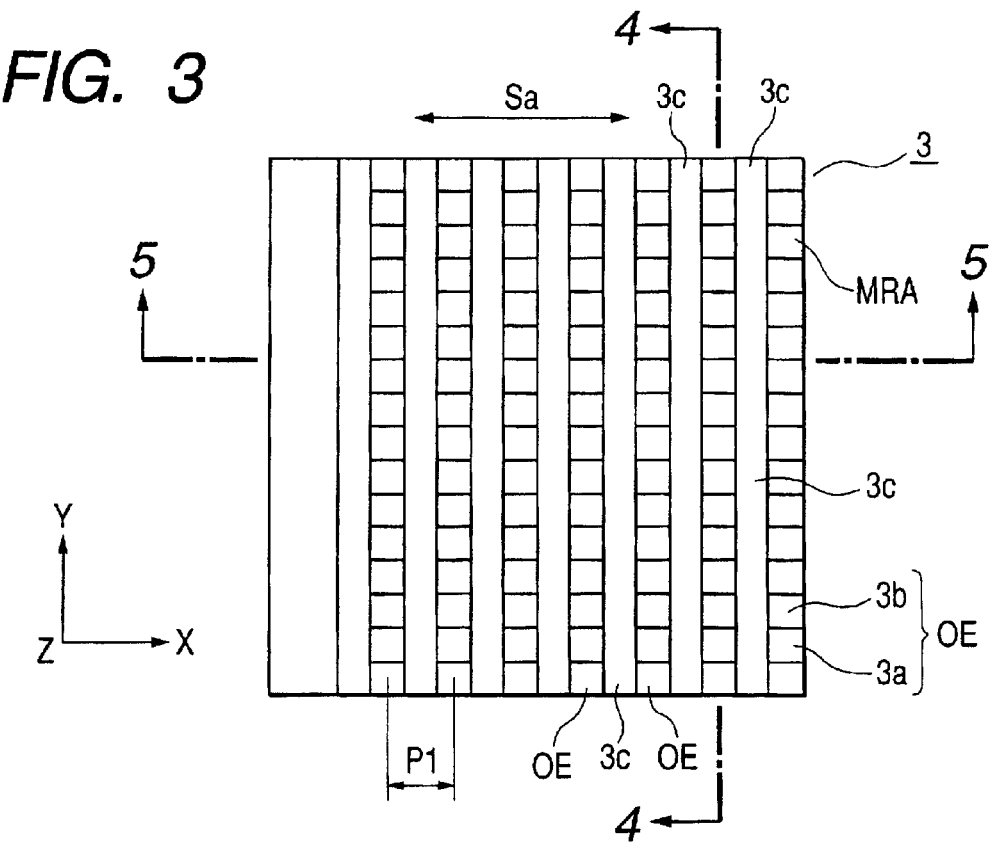
FIG. 3 is a plan view of the linear encoder scale in FIG. 2 when viewed from the direction of the optical axis of a light source.

FIG. 3 is a plan view (in the Z-axis direction) of the reflector 3 serving as a scale for a reflection linear encoder according to the second embodiment.

The reflection elements OE each having a one-dimensional convergence characteristic are arrayed along the displacement measuring direction Sa at a pitch P1 in FIG. 3. This pitch P1 corresponds to the scale pitch of the reflection linear encoder scale, and determines the measurement resolution in linear displacement measurement using the sensor.

The characteristic features of this reflector 3 will be described next with reference to sectional views taken along lines 4—4 and 5—5 in FIG. 3.

Figure 4:
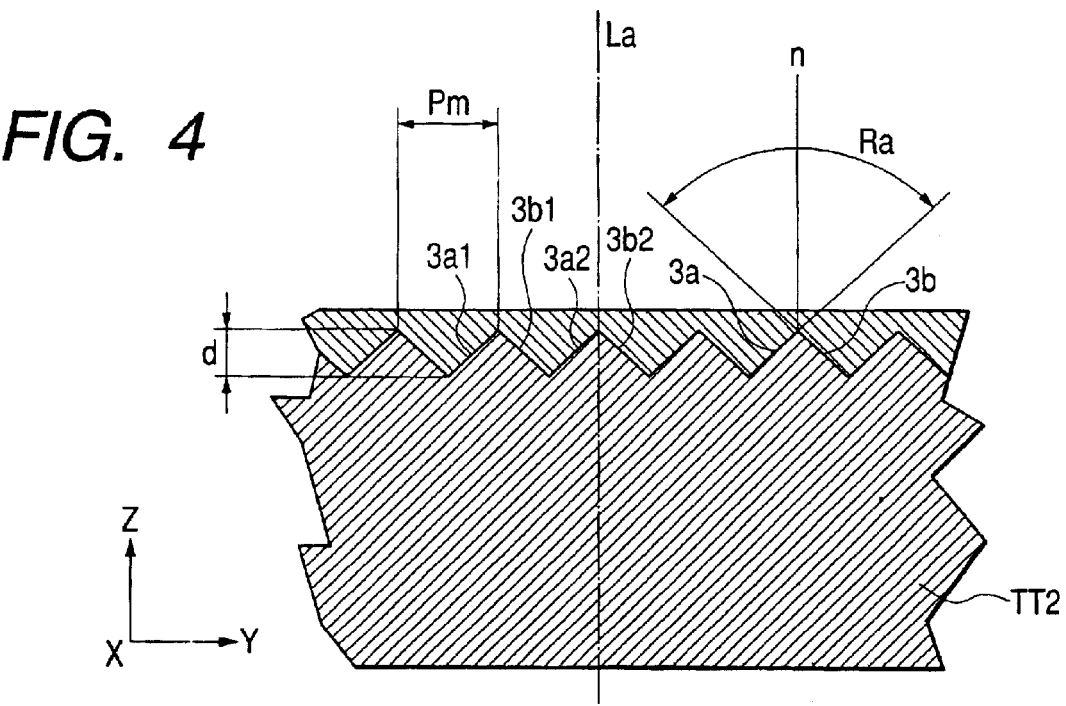
FIG. 4 is a sectional view taken along a line 4—4 of the linear encoder scale in FIG. 3.
Figure 5:
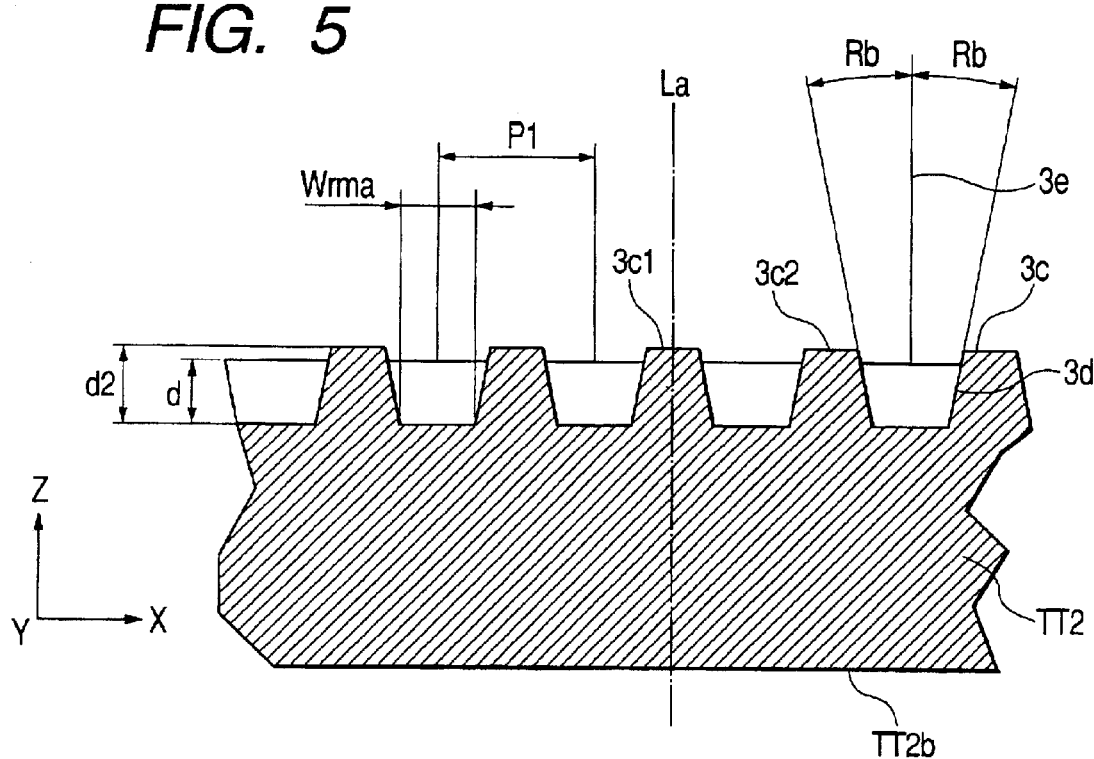
FIG. 5 is a sectional view taken along a line 5—5 of the linear encoder scale in FIG. 3.

FIGS. 4 and 5 respectively show a 4—4 cross section and 5—5 cross section in FIG. 3.

Two inclined surfaces 3a and 3b constitute each V-shaped groove OE.

The two inclined surfaces 3a (3a1, 3a2, . . . ) and 3b (3b1, 3b2, . . . ) define an angle Ra (the angle of the V-shaped groove). The V-shaped grooves are arrayed at an array pitch Pm. Each V-shaped groove has a depth d. Referring to FIG. 3, the reflection elements OE each having a one-dimensional convergence characteristic are arrayed at an array period P1 (=encoder scale pitch). The following are specific design values of the above shape parameters in this embodiment:

P1≈169 μm

Pm≈100·200 μm

Ra≈95°

Wrma≈85 μm d2≈Pm/2+10 μm d≈Pm/2 (50·100 μm)

Referring to FIG. 4, a straight line n is parallel to a principal ray La. In this embodiment, the line n equally divides the angle defined by a V-shaped groove.

Referring to FIG. 5, a surface 3c is a flat portion existing between V-shaped groove groups. A light beam that strikes this flat portion from a rear surface TT2b is not totally reflected but is transmitted, and hence is neither reflected nor guided to the light-receiving element portion on the encoder side. Any surface can serve as the surface 3c as long as it does not substantially reflect an incident light beam.

Referring to FIG. 5, an angle Rb defined by an inclined surface 3d and a normal 3e to the surface 3c between the surfaces 3c corresponds to the draw angle of a mold which is required to manufacture the reflection scale 3 by injection molding. More specifically, Rb≈3° to 5°.

The first and second embodiments use the effect of total internal reflection caused by the transparent member formed by a plurality of continuous V-shaped groove groups. For this reason, the reflector 3 substantially executes a reflection function without any aluminum reflection film formed on the surface of the substrate.

The reflector 3 of this embodiment is not limited to a transparent member using the effect of total internal reflection. For example, a reflection element having a one-dimensional convergence characteristic may be formed by forming V-shaped grooves in a soft metal plate such as an aluminum plate using an inexpensive process method such as a Px technique.

The characteristic features of a conventional reflector as a reflection surface obtained by forming an aluminum reflection film on the surface and a reflector using a reflection means having a one-dimensional convergence characteristic according to the present invention will be described below by comparing them with reference to FIGS. 6A to 10B.

Figure 6A:
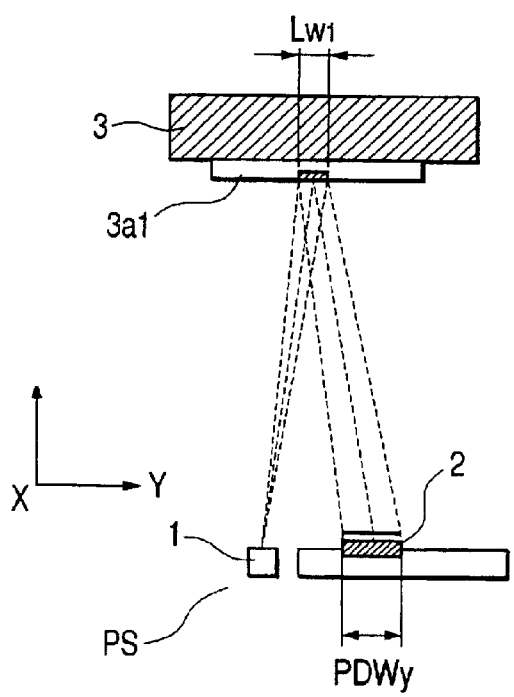
FIGS. 6A and 6B are views each showing the optical path of light reflected by a conventional reflector having an aluminum reflection film.
Figure 6B:
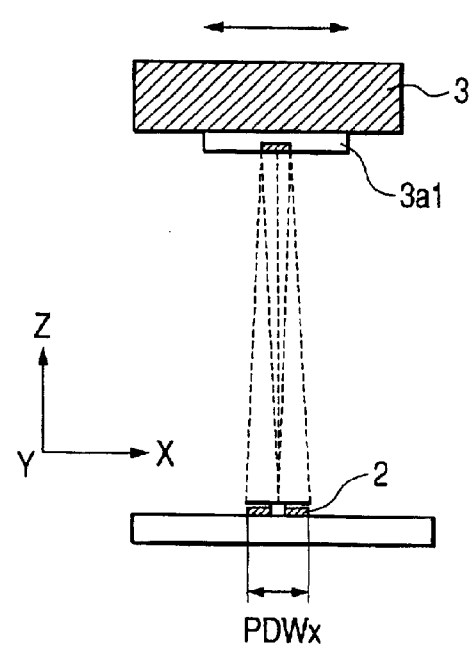

FIGS. 6A and 6B are views for explaining a conventional reflector 3 using a reflection surface obtained by forming an aluminum reflection film on the surface. Each of FIGS. 6A and 6B shows an optical path through which a light beam from a light source 1 of a photosensor PS is guided to a light-receiving element 2 through a reflection surface 3a1 of the reflector 3. This optical path is the same as that described with reference to FIG. 47.

Referring to FIGS. 6A and 6B, this arrangement is comprised of the light source 1, the light-receiving element 2 having a size PDWy×PDWx, and the reflector 3 having the aluminum reflection surface 3a1 formed on the surface.

Referring to FIGS. 6A and 6B, the dotted lines represent rays between the light source, the reflector, and the light-receiving element.

According to the geometrical relationship between the above components, a width Lw1 of a portion on the aluminum reflection surface 3a1 which is irradiated with an effective light beam is given by Lw1=½PDWy. If the size of the light-receiving element 2 is 400 μm, the size of this portion on the aluminum reflection surface is about 200 μm. As a consequence, only a small amount of rays from the light source 1 reach the light-receiving element 2.

Figure 7A:
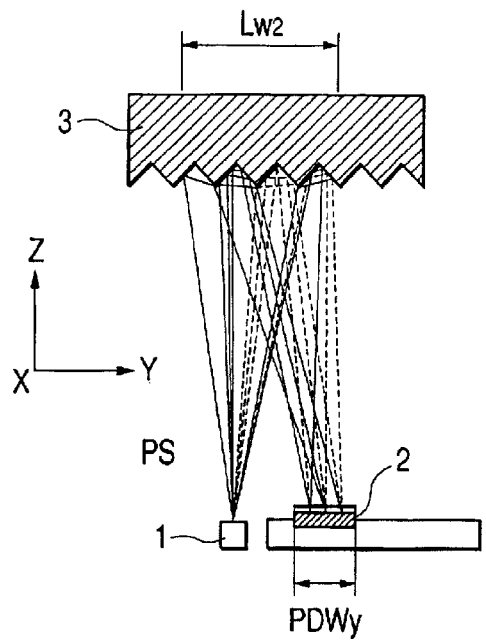
FIGS. 7A and 7B are views each showing the optical path of light reflected by a reflection target having the V-shaped grooves shown in FIG. 1.
Figure 7B:
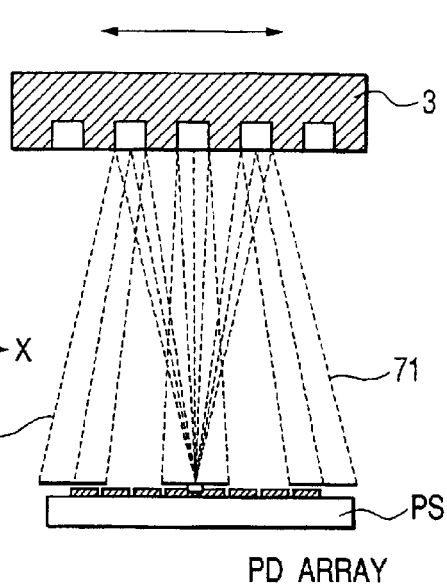

The relationship between the gap (distance) between the photosensor PS and the reflector 3 and the amount of light received by the light-receiving element 2 in this reflector 3 is expressed by light amount=1/(distance)$^2$ FIGS. 7A and 7B are schematic views each showing an arrangement using a reflector 3 having a V-shaped groove reflection surface (a reflection means having a one-dimensional convergence characteristic) according to the present invention. The first and second embodiments described above use total internal reflection caused by the transparent member. In this case, however, for the sake of simple explanation, a metal reflector in which V-shaped grooves exhibiting the same optical characteristics as those described above are formed is used. Referring to FIGS. 7A and 7B, each V-shaped groove surface is considered to have the same reflectance as that of the above aluminum reflection film, and the angle (Ra) of the V-shaped groove is set to about 95° to form a similar optical path.

The optical path extending from a side surface in FIG. 7B is the same as that shown in FIG. 6B. However, in contrast to the light beam irradiation width Lw1 in FIG. 6A, the divergence angle of a light beam in FIG. 7A increases to set a light beam irradiation with Lw2. With this arrangement, as shown in FIGS. 7A and 7B, light reflected twice by each V-shaped groove surface, and many rays are guided to the light-receiving element 2 of the photosensor PS.

Since the light source 1 is spaced apart from the light-receiving element 2, rays can be guided to a target light-receiving position by adjusting the angle Ra. In this case, since the angle Ra is set to about 95°, actual rays are guided not only to the light-receiving element 2 but also to a position symmetrical with the light-receiving element 2 with respect to the light source 1 (rays 71 indicated by the dotted lines in FIG. 7B).

Figure 8A:
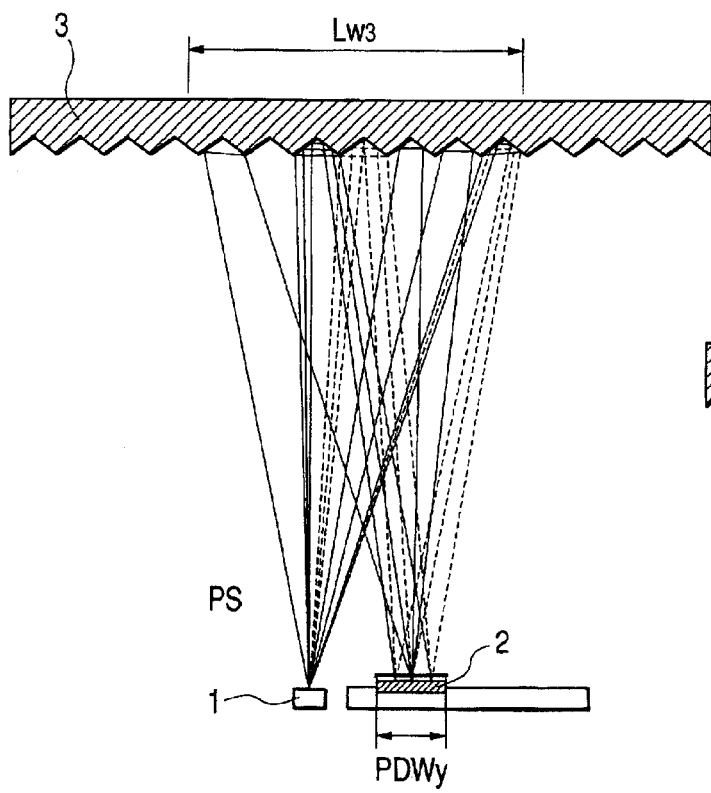
FIGS. 8A and 8B are views showing the gap characteristics of a reflection scale according to the present invention.
Figure 8B:
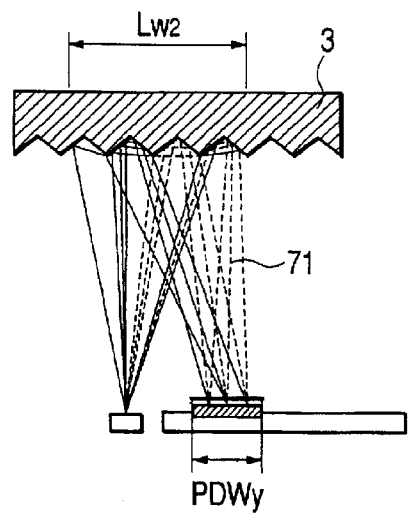

FIGS. 8A and 8B are views for explaining an effect of the reflector according to the present invention which differs from the effect described above. This effect corresponds to performance associated with the gap characteristic between a photosensor PS of a so-called reflection encoder and a scale (reflector) 3. FIG. 8A shows a state where the photosensor PS and reflector 3 are spaced far from a reference position. FIG. 8B shows a case of a standard reference distance.

In the conventional reflector, the light amount detected by the light-receiving element 2 substantially has a proportional relationship expressed by substantially $1/(distance)^2$. If, therefore, the gap in FIG. 8A is double the gap in FIG. 8B, the light amount detected by the light-receiving element 2 in FIG. 8A is substantially about 25% smaller than that in FIG. 8B.

According to the reflection scale using the present invention, however, as is obvious from FIGS. 7A to 8B, the rays detected by the light-receiving portion do not depend on variations in gap (distance). The rays detected by the light-receiving element 2 in FIG. 7B, therefore, have a relationship expressed by 1/distance. As described above, another merit of the present invention is that the light amount detected by the light-receiving element 2 is insensitive to variations in gaps.

Figure 9:
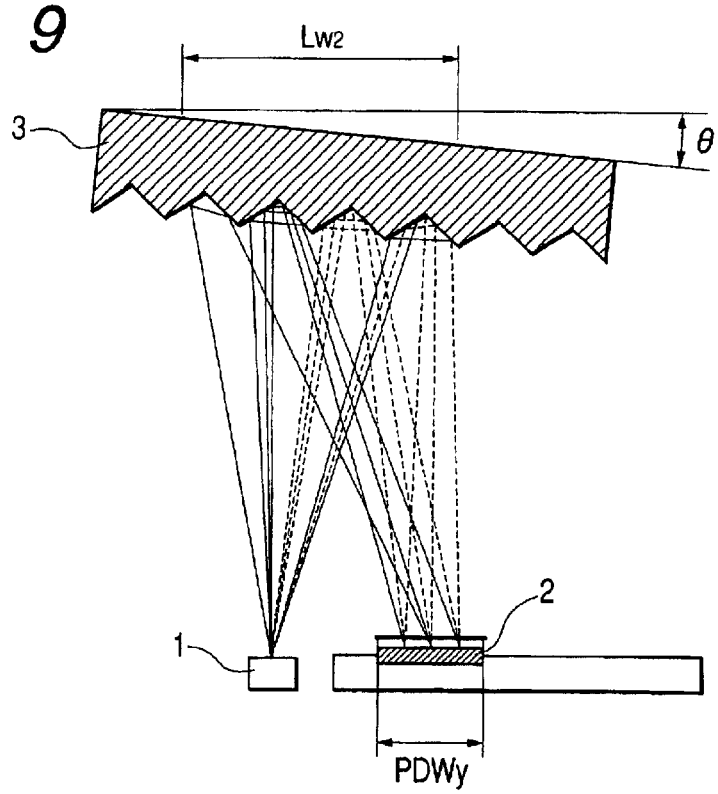
FIG. 9 is a view showing the tilt characteristics of a reflection scale according to the present invention.

FIG. 9 is a view for explaining still another effect of the present invention.

This effect corresponds to performance associated with relative tilt (inclination) characteristics between a photosensor PS and a reflector 3 in a so-called reflection encoder. As shown in FIG. 9, even if the tilt (θ) of the reflection scale 3 in the present invention changes, rays are stably guided from the reflector 3 to the light-receiving portion 2.

As described above, when the reflector 3 having the V-shaped grooves or V-shaped groove groups according to the present invention is used, the absolute amount of light guided to the light-receiving portion 2 of the photosensor PS is larger than that when the conventional reflector is used.

Even if the distance (gap) between the reflection scale and the photosensor varies, the light amount detected by the light-receiving portion hardly changes, and the detected light amount is expressed by (1/distance).

The light amount detected becomes insensitive to the relative tilt (θ) between the photosensor and the reflector, and hence does not greatly decrease.

Other embodiments of the present invention will be described next with reference to FIGS. 10A to 20.

For the sake of simple explanation of each embodiment, a metal reflector having V-shaped grooves will be exemplified.

(Third Embodiment)

Figure 10A:
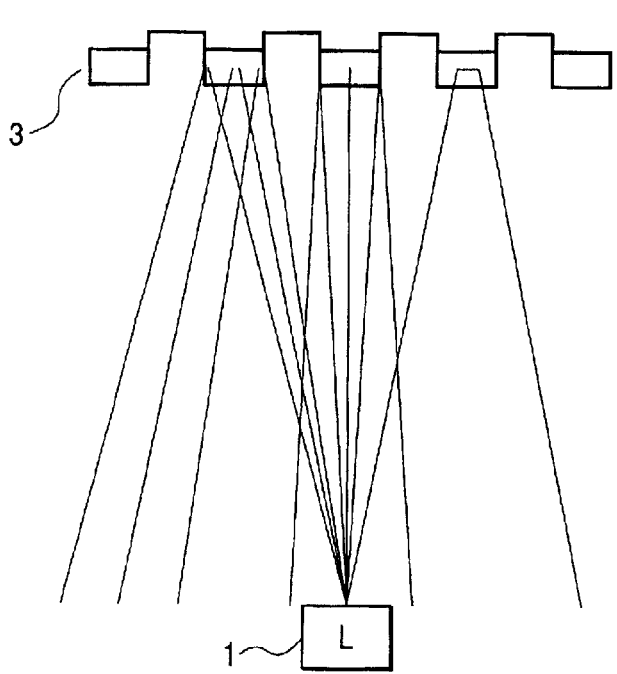
FIGS. 10A and 10B are views each showing the optical path of light reflected by a reflection scale according to the present invention.
Figure 10B:
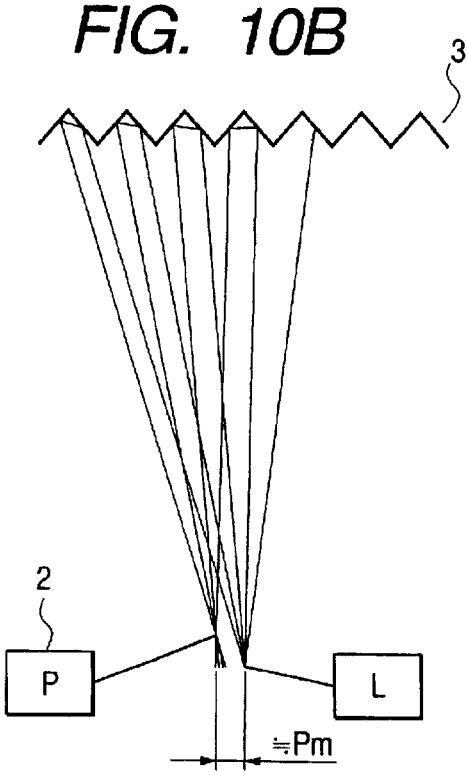

FIGS. 10A and 10B show the third embodiment, in which a reflector has the same arrangement as that of the second embodiment but differs only in that an angle Ra defined by two inclined surfaces 3a and 3b of each V-shaped groove is set to 90°.

In this case, the distance between an emission point position L of a light source 1 and a light-receiving (focusing) point position P of a light-receiving portion 2 is almost equal to an array pitch Pm of the V-shaped grooves. The optical characteristic at angle Ra=90° is equivalent to a one-dimensional retroreflection effect.

As is obvious from FIG. 10B, with angle Ra=90°, as the emission point position L is too close to the light-receiving (focusing) position P, the light source 1 mechanically interferes with the light-receiving portion 2 in practice unless the pitch Pm of V-shaped grooves is set to be large.

If the pitch Pm of V-shaped grooves is increased too much, the thickness of the reflector undesirably increases. Therefore, this technique is not a good solution.

Figure 12:
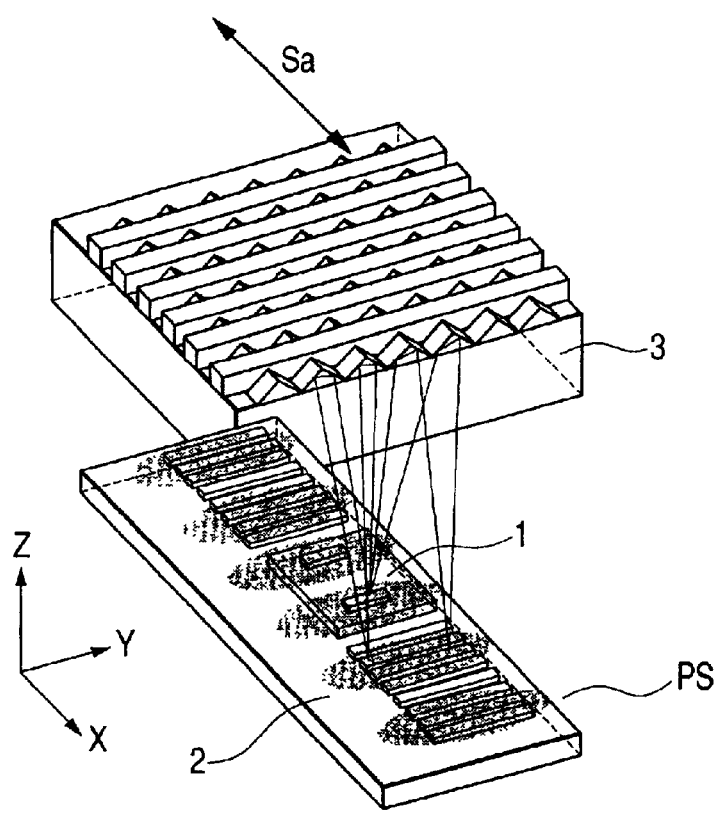
FIG. 12 is a view showing the optical path of light reflected by a reflection scale according to the present invention without an offset.

If the pitch Pm is set to an appropriate value with Ra=90°, the arrangement shown in FIG. 12 can be used as a feasible arrangement on the photosensor side.

Referring to FIG. 12, a reflection scale 3 is formed by a transparent member, and angle Ra=90° is set.

In this case, the above problem can be avoided by mounting LED chips 1 on a silicon photodiode chip serving as a light-receiving element 2. This arrangement is preferable in terms of high packing density, but consideration must be given to the generation of heat by each LED chip 1.

Figure 13:
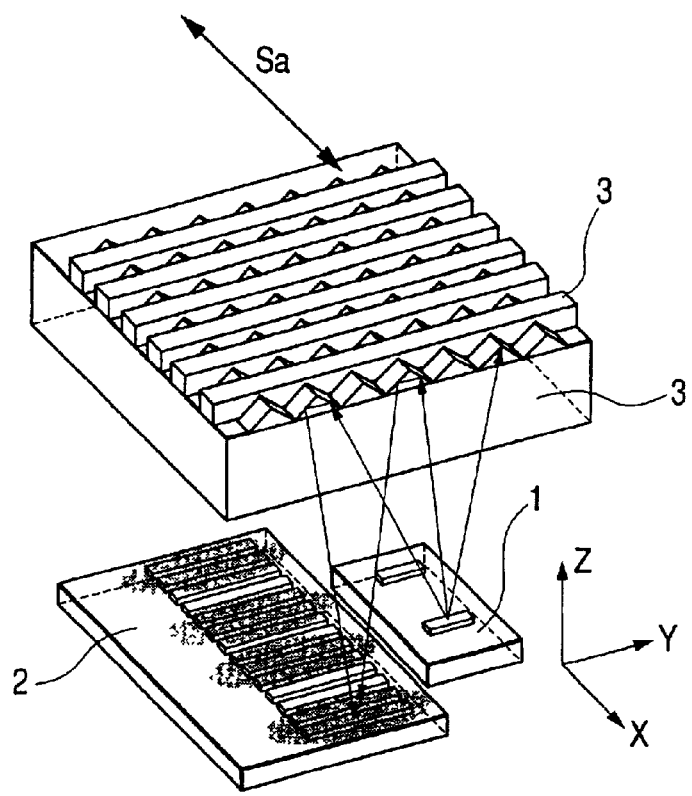
FIG. 13 is a view showing the optical path of light reflected by the reflection scale according to the present invention with an offset.

It is preferable in terms of a mount surface that an angle offset be provided (an angle larger than 90° is set) and a silicon photodiode 2 and LED chip 1 be mounted side by side on the same mount surface, as shown in FIG. 13.

As an effective means, therefore, the angle Ra is preferably set to an angle larger than 90°.

Figure 11B:
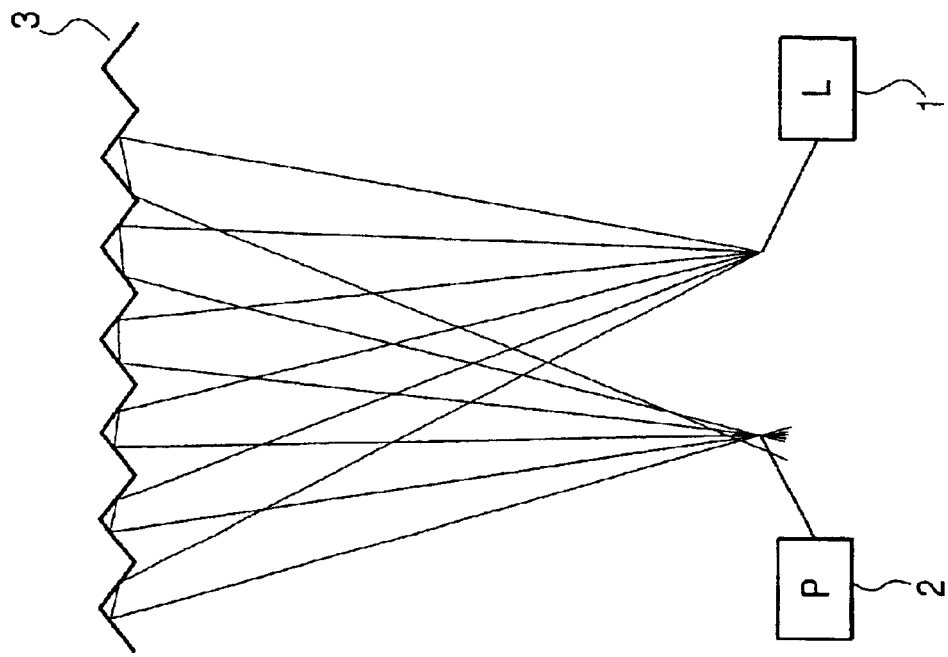
FIGS. 11A and 11B are views respectively showing the optical paths of light reflected by a reflection scale according to the present invention with and without an offset with respect to a convergent light beam position.
Figure 11A:
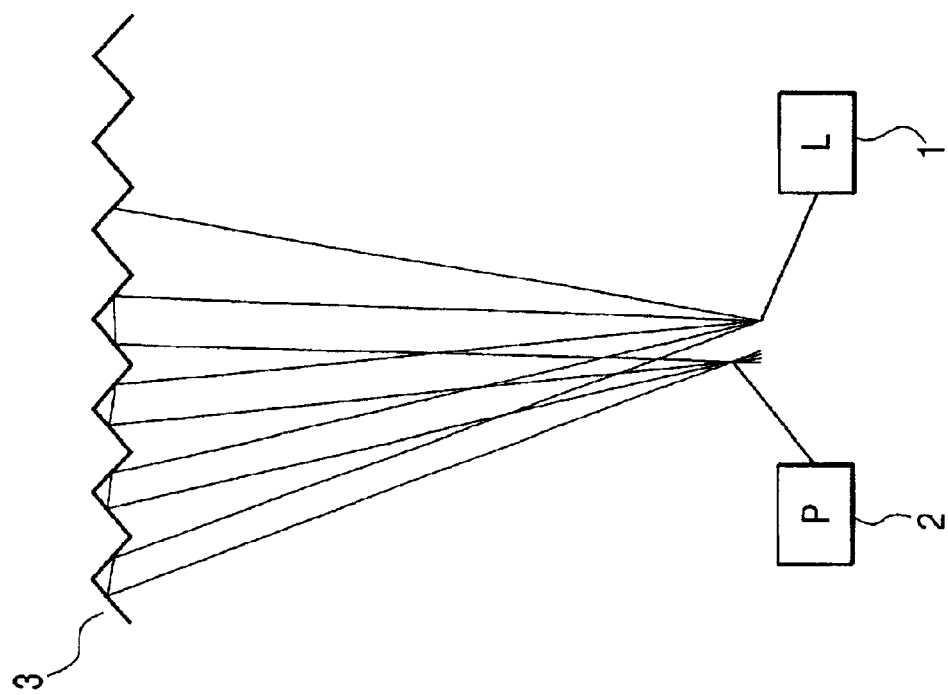

In the above drawings (FIGS. 6A to 9) for the explanation of V-shaped grooves, the angle Ra is set to about 95°. FIG. 11A is a ray diagram showing a case of angle Ra=90°, and FIG. 11B is a ray diagram showing a case of Ra=95'.

As described above, the angle Ra defined by each V-shaped groove is an important variable parameter in design.

A case where V-shaped grooves are formed in a metal reflection member has been described above.

If a transparent member is used, an optical total reflection condition is added. In order to efficiently guide rays from the light source to the light-receiving element 2, therefore, constituent elements that can be improved can be used as well as an array of V-shaped grooves and array pitch.

FIGS. 14A to 16B are views for explaining other embodiments of the present invention. These embodiments exemplify several arrangements for guiding rays from a light source 1 (L) to a light-receiving element 2 (P) through a reflector 3 more efficiently.

(Fourth Embodiment)

Figure 14A:
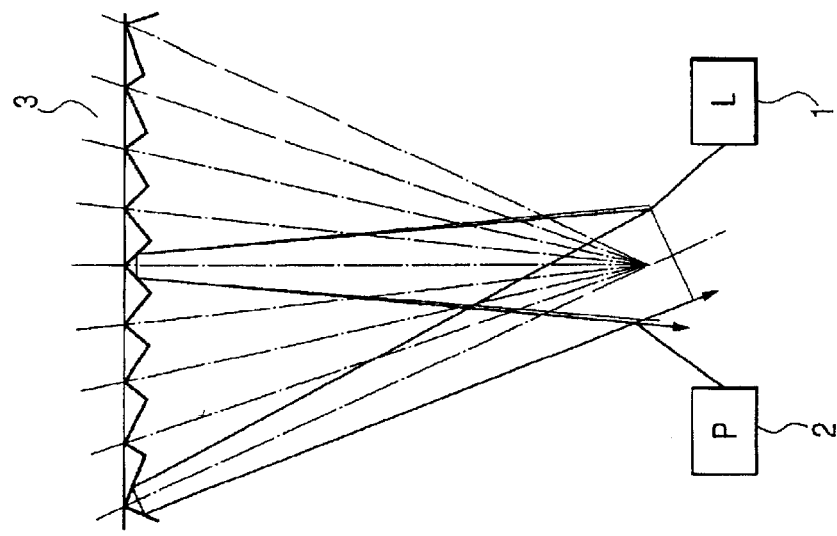
FIGS. 14A, 14B and 14C are views showing reflection scales according to embodiments of the present invention.

FIG. 14A is a view showing the fourth embodiment in which a basic arrangement (Ra=95°) is set for comparison. A light source 1 and light-receiving element 2 can be spaced part from each other. This method allows appropriate setting of light-emitting and light-receiving positions.

(Fifth Embodiment)

Figure 14B:
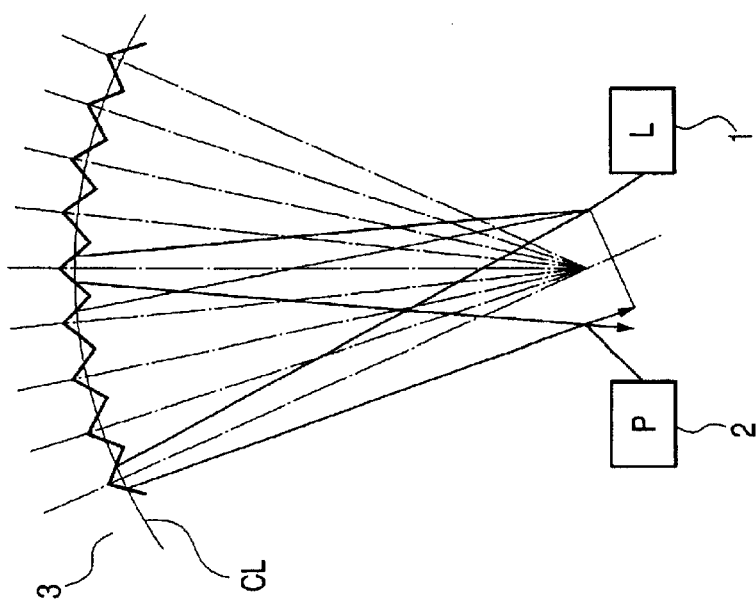

FIG. 14B shows an arrangement in which V-shaped grooves are arrayed along a cylindrical surface CL (part of a cylindrical or elliptical surface). If a transparent member is used, a wide incident angle allowable range can be set for rays incident on the surface of each V-shaped groove, and the amount of light received is stable as compared with the arrangement shown in FIG. 14A which is susceptible to restrictions on a total reflection condition.

(Sixth Embodiment)

Figure 14C:
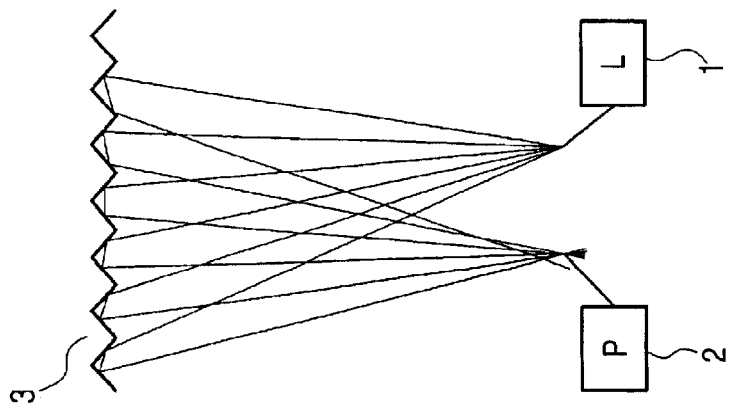

FIG. 14C shows the sixth embodiment, in which V-shaped grooves are linearly arranged while the directions of the respective V-shaped grooves (the angular directions indicated by the chain lines) in FIG. 14B are kept unchanged. In the arrangement shown in FIG. 14B, bending of the reflector increases its thickness. This arrangement provides an improvement on this point.

(Seventh Embodiment)

Figure 15B:
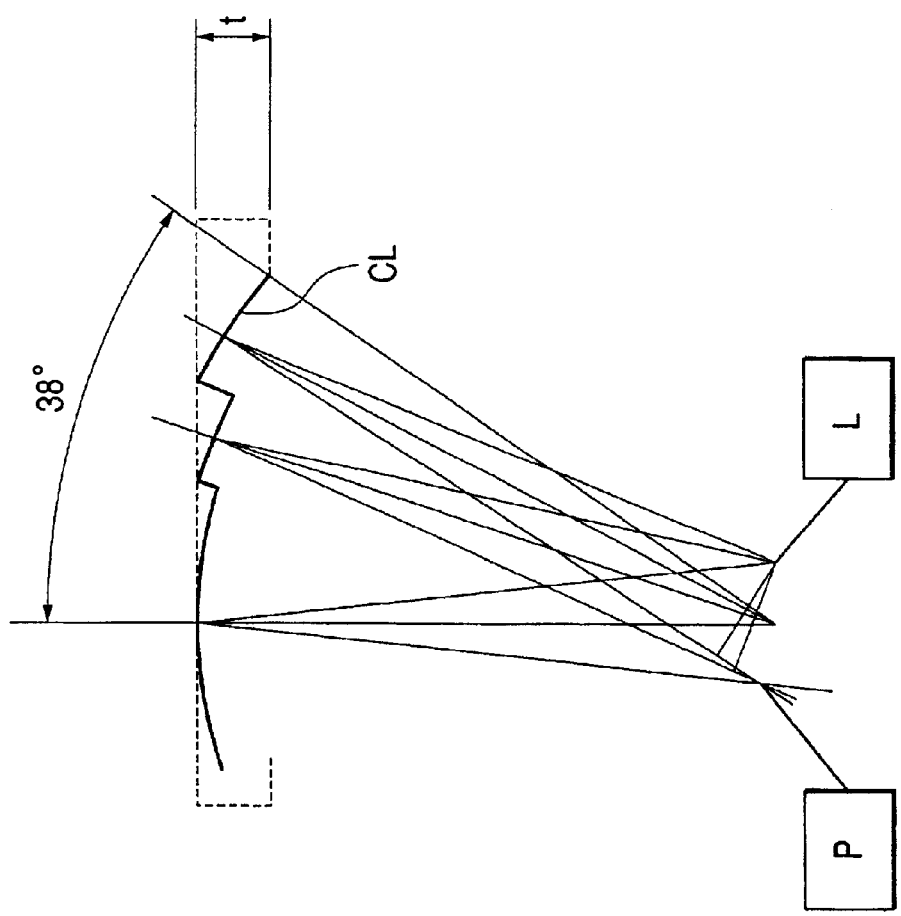
FIGS. 15A and 15B are views showing reflection scales according to other embodiments of the present invention.
Figure 15A:
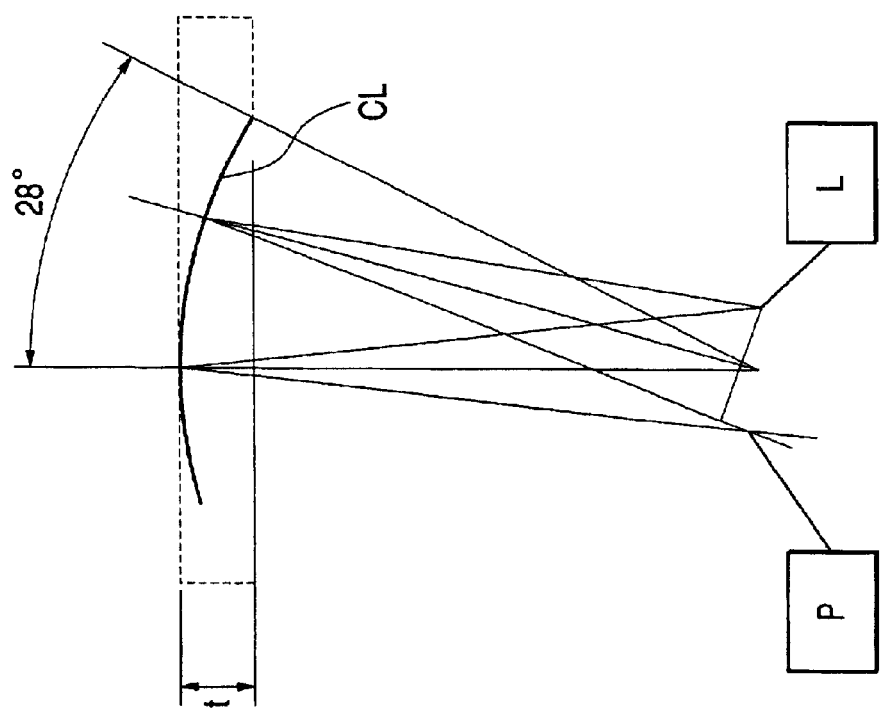

The concept of the present invention can be applied not only to V-shaped grooves but also to the arrangement shown in FIG. 15A which is the seventh embodiment or its modification shown in FIG. 15B which is the eighth embodiment.

The seventh embodiment shown in FIG. 15A exemplifies a reflection element having a one-dimensional convergence characteristic which is obtained by forming a reflection film such as an aluminum deposition film on a cylindrical surface CL. Like the V-shaped grooves of the types described above, this arrangement can solve the technical problems in the prior art.

(Eighth Embodiment)

FIG. 15B shows the eighth embodiment, in which a cylindrical surface CL is formed by combining curved surfaces having different curvatures in order to avoid the problem of an increase in thickness. A reflection film is formed on this composite cylindrical surface CL.

Compare the arrangements shown in FIGS. 15A and 15B on the condition that each reflection element having a one-dimensional convergence characteristic is limited to a certain thickness. Consider, in these embodiments, with the same thickness t, the ranges in which light beams from the light sources can be guided to the wider light-receiving portions. In this case, in the arrangement with the composite cylindrical surface shown in FIG. 15B, a reflected light beam diverges by≈10°. With such a modification, the use efficiency of light amount further improves.

(Ninth Embodiment)

FIG. 16A shows the ninth embodiment, in which a reflection Fresnel zone plate is used as a reflector. In this case, a reflection surface is formed on a reflection unit 105(A) by using the total internal reflection effect of each V-shaped groove.

(10th Embodiment)

FIG. 16B shows the 10th embodiment, in which the arrangement shown in FIG. 14B is further improved such that a reflection surface is formed on a composite cylindrical surface CL by using the total internal reflection effect of each V-shaped groove without forming any aluminum reflection film.

Figure 17:
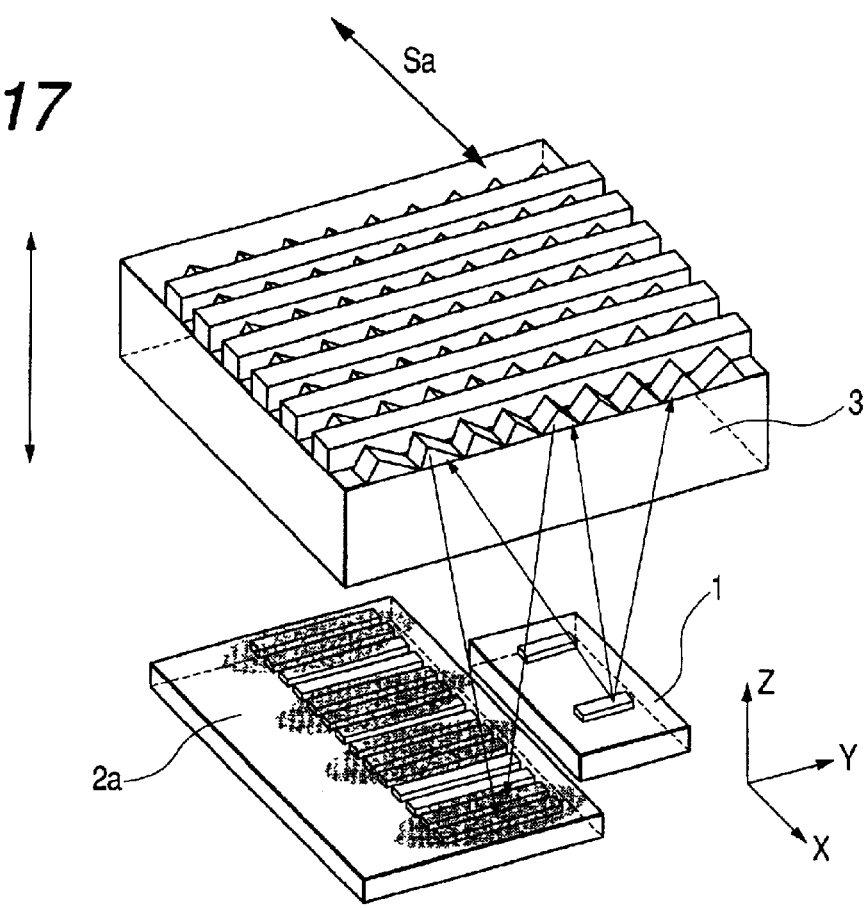
FIG. 17 is a view for explaining the use efficiency of light amount from the reflection scale according to the present invention.

FIG. 17 shows an arrangement in which a reflector 3 having the reflection element with a one-dimensional convergence characteristic shown in FIG. 14C is used as a reflection scale for a linear encoder.

Figure 18:
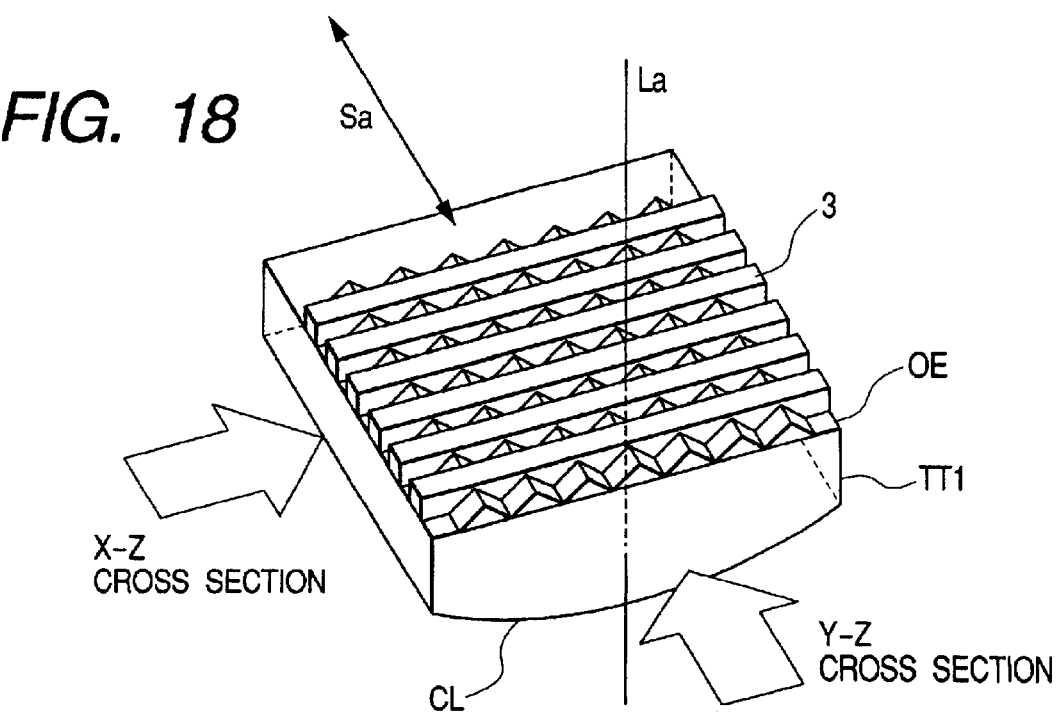
FIG. 18 is a view showing a reflection scale according to still another embodiment of the present invention.
Figure 19B:
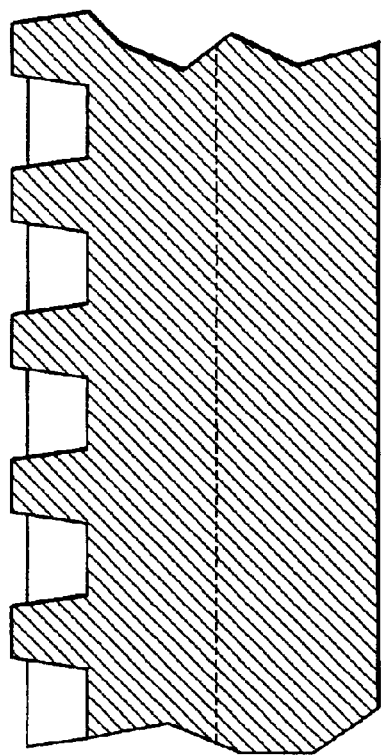
FIGS. 19A and 19B are views showing a reflection scale according to still another embodiment of the present invention.
Figure 19A:
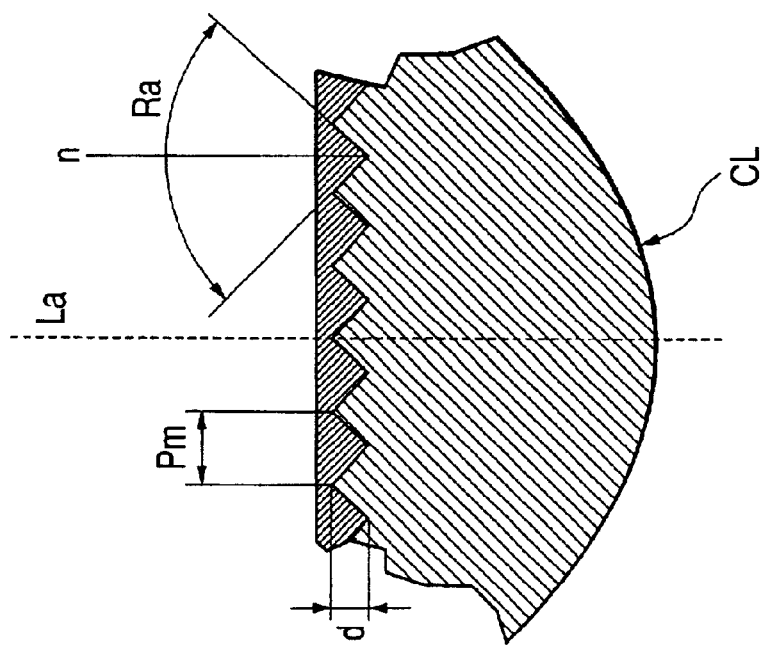

(11th Embodiment) FIGS. 18 and 19A and 19B are views showing a reflection scale 3 for a reflection linear encoder, which has V-shaped groove groups OE periodically formed in a transparent member TT1, according to the 11th embodiment, in which the use efficiency of light is improved by integrally or separately forming a cylindrical surface CL on the rear surface of a transparent substrate in the arrangement of the second embodiment.

FIGS. 19A and 19B show a Y-Z cross section and X-Z cross section of this arrangement. A divergent light beam from a light source is converted into a substantially parallel light beam by the cylindrical surface CL. When this light beam repeatedly undergoes total internal reflection twice on a V-shaped groove surface and passes through the cylindrical surface CL, the light beam is converted into a convergent light beam and guided to a light-receiving portion (not shown).

Figure 20:
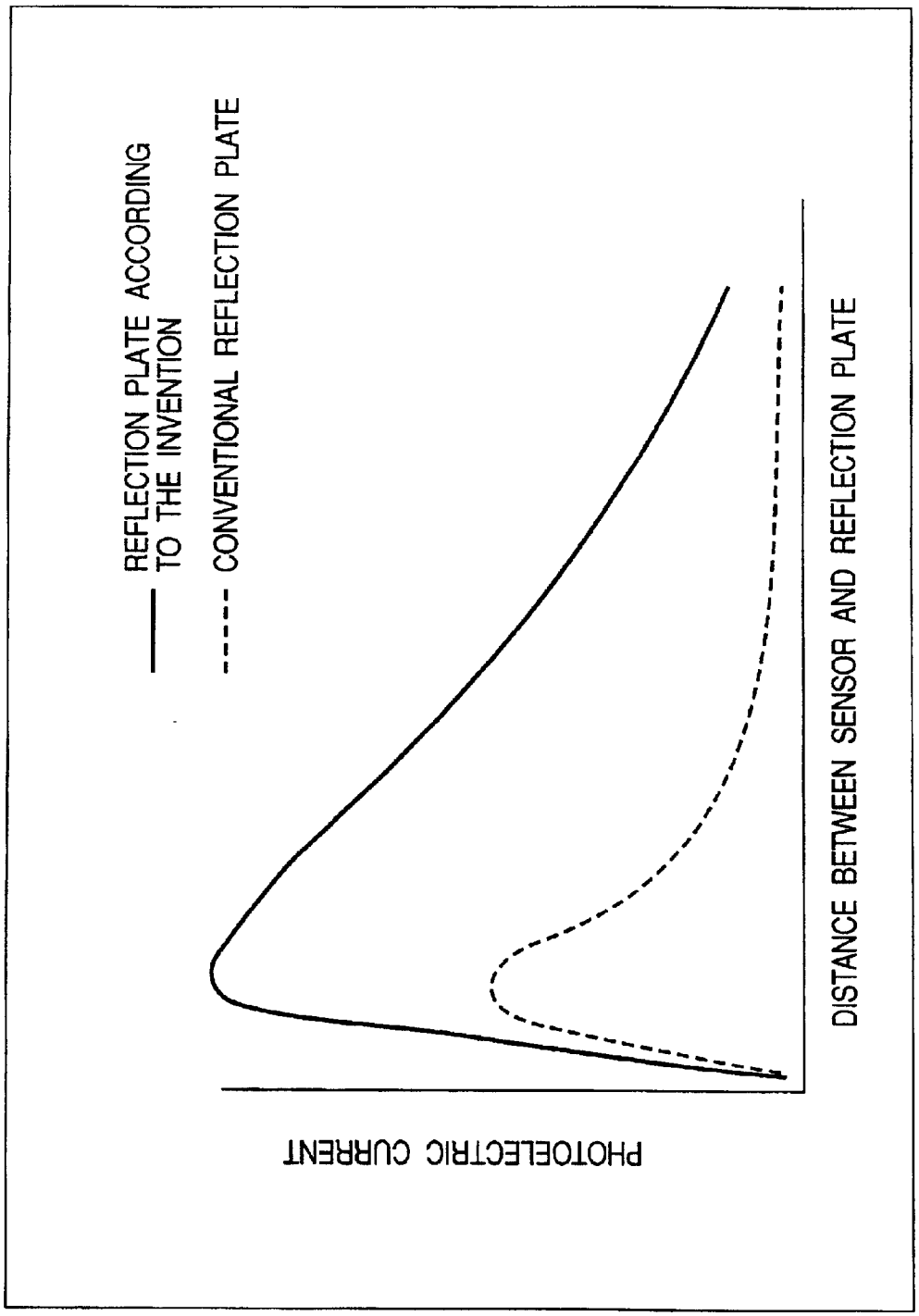
FIG. 20 is a perspective view showing a reflection scale according still another embodiment of the present invention.

FIG. 20 is a view showing the relationship between the distance between a photosensor and a reflector and the value of a photocurrent generated when the light-receiving portion of the photosensor detects light in a case where the reflector having a one-dimensional convergence characteristic according to the present invention is used for, for example, an encoder, in comparison with a case where the conventional reflection plate (the reflector obtained by forming an aluminum deposition film on a flat plate) is used. When the reflection element having the one-dimensional convergence characteristic according to the present invention is used, the absolute amount of light that can be received increases. As a consequence, a large photocurrent is obtained. This increases the photocurrent peak.

According to distance characteristics as well, since characteristics represented by 1/distance are obtained in the present invention as compared with characteristics represented by $1/(\text{distance})^2$ in the prior art, excellent characteristics can be obtained.

Note that the present invention has exemplified a linear encoder, but can also be applied to a scale for a reflection rotary encoder.

(12th Embodiment)

Figure 21A:
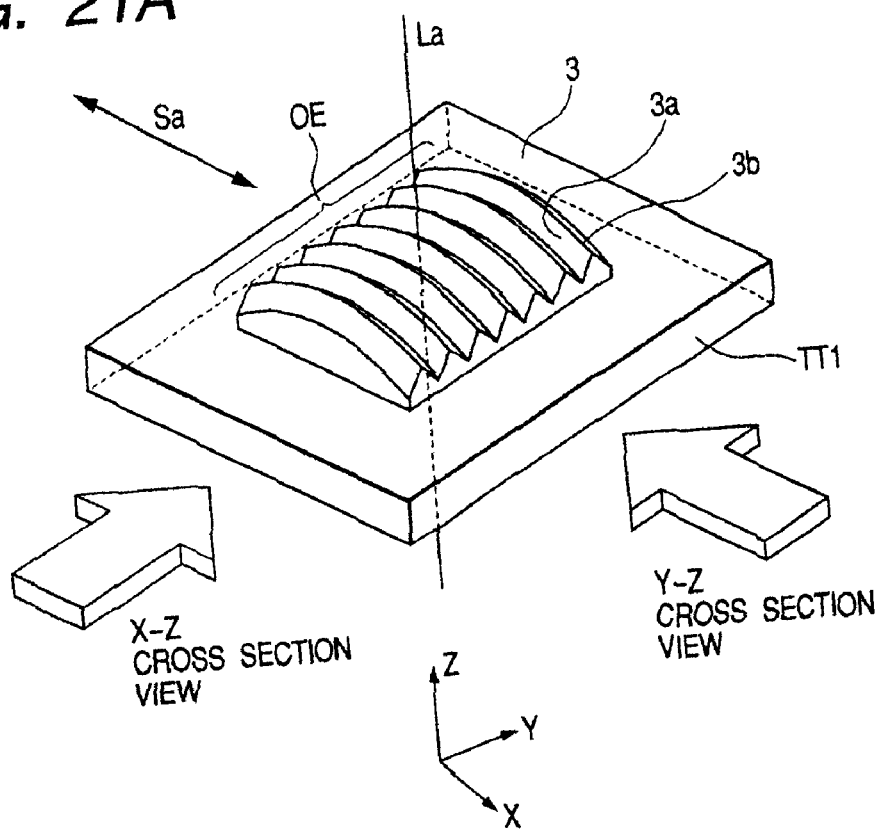
FIGS. 21A and 21B are perspective views showing a reflection element having a one-dimensional convergence characteristic according to the 12th embodiment of the present invention.
Figure 21B:
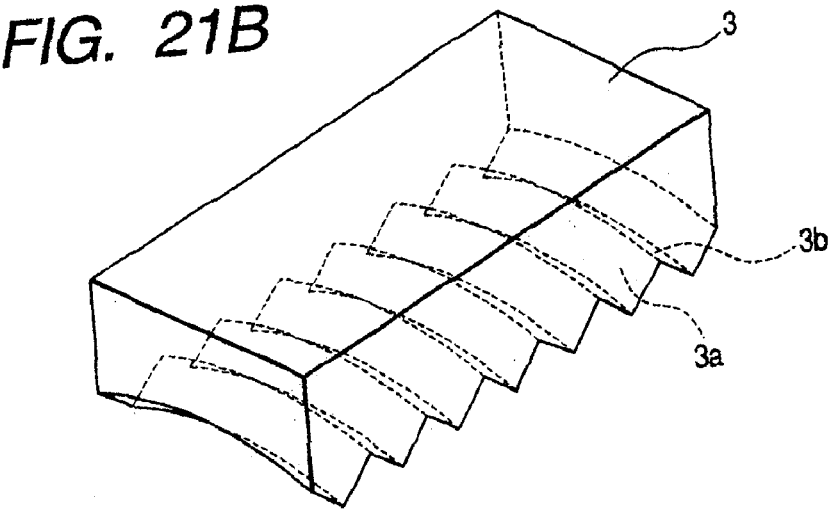

FIGS. 21A and 21B are perspective views showing the main part of a reflector (reflection element) having a two-dimensional convergence characteristic according to the 12th embodiment.

A characteristic feature of this embodiment is that it has the second reflecting action owing to the formation of V-shaped grooves in a surface of a cylindrical member side in addition to the first reflecting action owing to the above V-shaped grooves.

This arrangement will be described below with reference to FIGS. 44A and 44B.

Figure 44A:
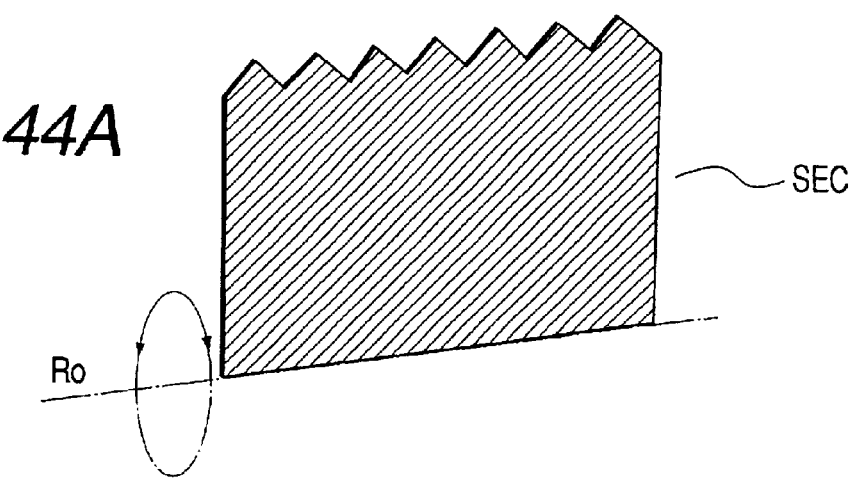
FIGS. 44A and 44B are views for explaining a reflector (reflection element) having a two-dimensional convergence characteristic.

"SEC" in FIG. 44A indicates the shape of a main cross-sectional view which is used to explain the first basic reflecting action described above. When this plane SEC is rotated around a rotation axis Ro, a plurality of V-shaped grooves are obtained in a surface of the cylindrical member side, as shown in FIG. 44B. A characteristic feature of "second reflecting action" is that some of the V-shaped grooves formed in the surface of this cylindrical member side form a reflection beacon. With such a plurality of curved surfaces, a roofmirror or roof prism forming a reflection element OE is formed.

Figure 44B:
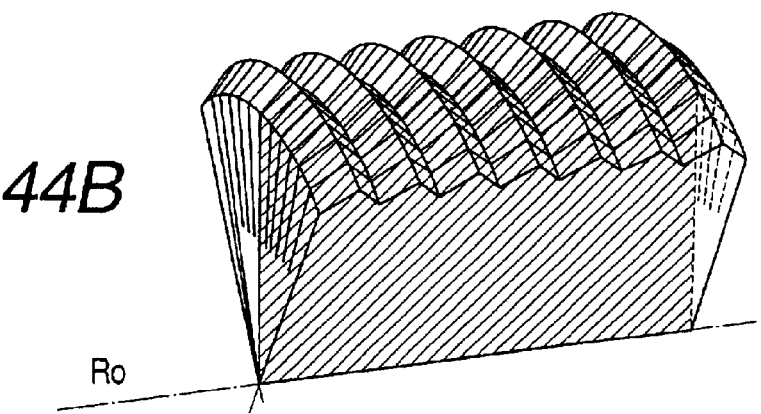

(In FIGS. 44A and 44B, parts of two conical surfaces are combined to form the reflection element OE.)

Figure 45A:
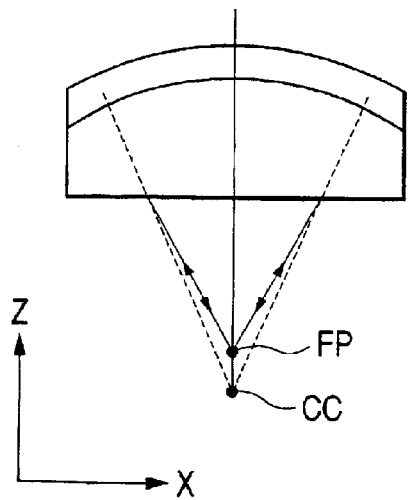
FIGS. 45A and 45B are schematic views showing the optical paths of a reflector according to the present invention.
Figure 45B:
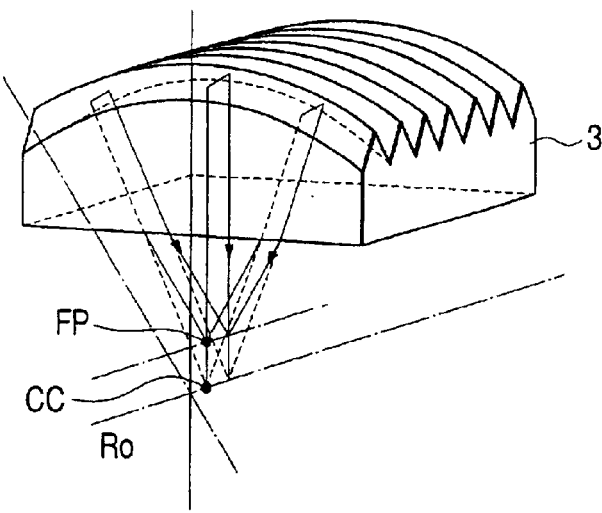
Figure 46:
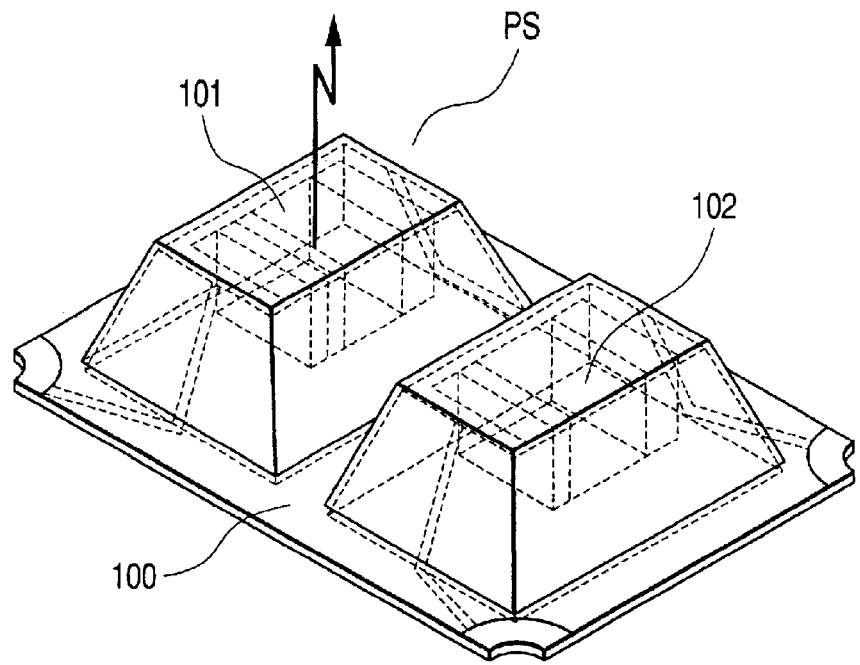
FIG. 46 is a perspective view showing a conventional reflection sensor and photoreflector.

FIGS. 45A and 45B show an example of a reflection beacon unit formed by arraying a plurality of reflection elements OE each identical to the one described above in the Y-axis direction. This unit is identical to the one shown in FIGS. 21A and 21B.

FIGS. 45A and 45B show a rotational symmetric axis Ro of a V-shaped groove. An arbitrary point CC is set on the rotational symmetric axis, and a light source is placed at a point FP, which is a focusing position when this reflector is irradiated with a divergent light beam.

Since a transparent member 3 is used, the points FP and CC do not coincide with each other. However, if the reflector 3 is a reflector that directly receives a light beam from a light source as shown in FIG. 1B, FP=CC.

The first reflecting action is the action that a divergent light beam from a light source is made to have a convergence characteristic by a reflector having a plurality of reflection elements OE, each formed by a plurality of reflection surfaces $3a$ and $3b$, arrayed in the Y-axis direction, i.e., an "MRA" (Micro Roofmirror(Prism) Array) having an array of micro roofmirrors or roofprisms.

The second reflecting action is the action that a focusing effect is obtained with respect to components different from those subjected to the first reflecting action by the optical action obtained by curved surfaces which are reflection surfaces on which the above reflection elements OE are formed.

This reflector is characterized by using these two different reflection convergence effect and reflection focusing effect for a divergent light beam from a light source.

The reflector exhibits a reflection performance characteristic different from the characteristic of a conventionally known reflection concave mirror. A reflection element having a two-dimensional convergence characteristic can be realized without using any reflection film or the like.

The optical action of the reflection element (reflector) having a two-dimensional converge characteristic according to the 12th embodiment of the present invention will be described next with reference to FIGS. 21A and 21B.

A reflector 3 in FIGS. 21A and 21B is irradiated with a light beam (not shown) from a sensor light source as a part of a photosensor from below the reflector 3 (the surface opposing the surface in which V-shaped grooves are formed). The light beam travels through a transparent member TT1. Of this light beam, the light beam that has reached a V-shaped groove portion repeatedly undergoes total internal reflection twice. The reflected light beam is returned to a space on the light source 101 side of the photosensor and guided to a sensor light-receiving portion as a part of the photosensor. Referring to FIGS. 21A and 21B, the reflector 3 is displaced in a displacement direction Sa. In this embodiment, the displacement direction is not limited to the direction Sa, and the movement of the reflector 3 can be detected in other directions, e.g., a direction (Y-axis direction) perpendicular to the direction Sa and a direction included in an X-Y plane.

(13th Embodiment)

Figure 22A:
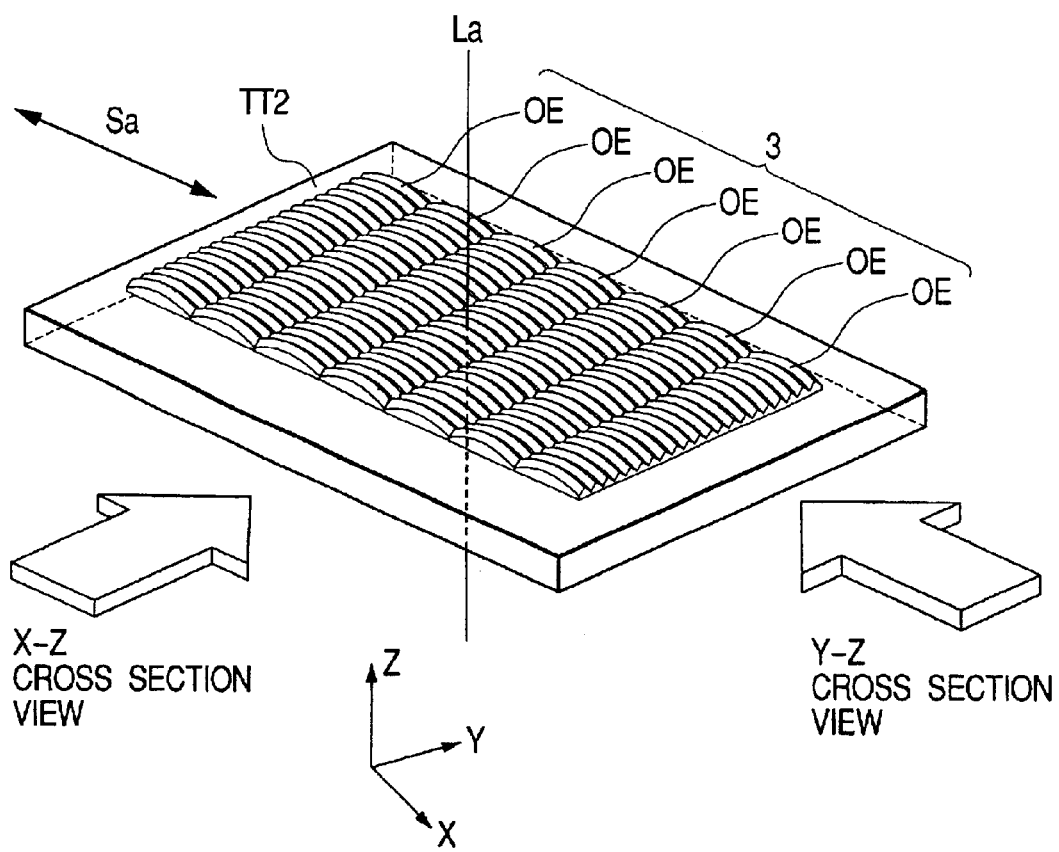
FIGS. 22A and 22B are perspective views showing a reflection element having a one-dimensional convergence characteristic according to the 13th embodiment of the present invention, which is used as a linear encoder scale.
Figure 22B:
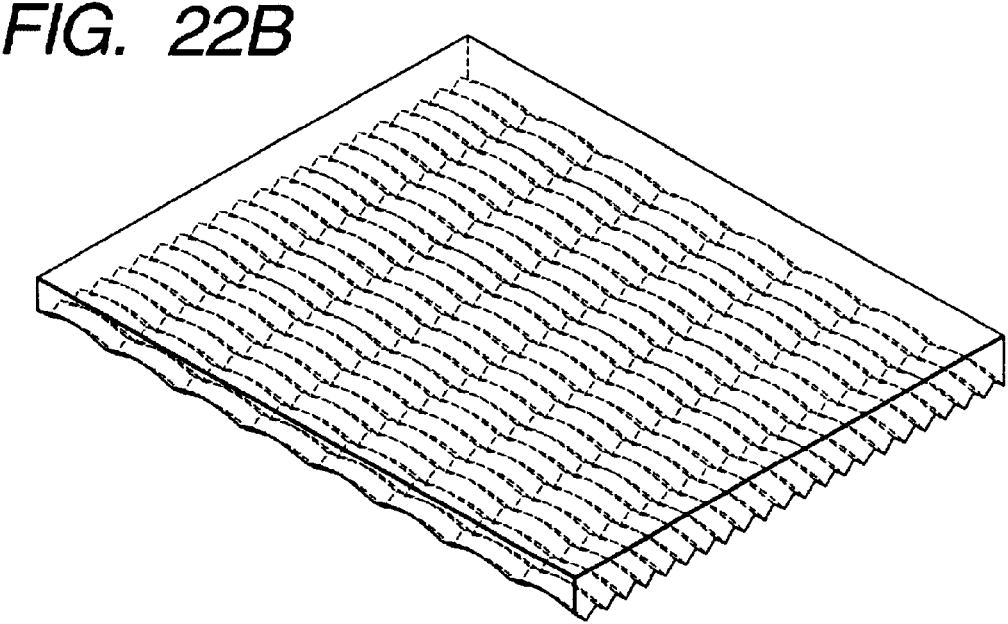

FIGS. 22A and 22B are perspective views showing the main part of a reflector according to the 13th embodiment.

In the 12th embodiment, a reflection means having a two-dimensional convergence characteristic is applied to a reflector 3 serving as a scale for a reflection linear encoder. As in the first embodiment described above, in this embodiment, the reflection portion of the reflector 3 is formed by a plurality of continuous V-shaped grooves, and its optical reflecting action is the same as the total internal reflecting action of a transparent member like the one described above.

A "V-shaped groove group" OE formed by an array of such a plurality of continuous V-shaped grooves is used as a reflection means serving as an integral optical element.

This embodiment differs from the first embodiment in that a plurality of V-shaped groove groups OE, instead of one, are periodically arranged along a reflector substrate surface TT2 in a moving direction Sa.

Referring to FIGS. 22A and 22B, a normal La is perpendicular to the emission surface of a light source in a reflection-type encoder (not shown). This normal La coincides with the principal ray of the light beam emitted from the light source to be applied to the reflector 3. The principal ray almost perpendicularly crosses the reflection scale (reflector 3).

FIG. 23A is a plan view (in the Z-axis direction) of the reflector 3 serving as a scale for a reflection linear encoder according to the 12th embodiment.

The reflection elements OE each having one-dimensional convergence characteristic according to this embodiment are arrayed along the displacement measurement direction Sa at a pitch P1. This pitch P1 corresponds to the scale pitch of the reflection linear encoder scale, which determines the measurement resolution in measuring a linear displacement using the sensor.

Figure 24:
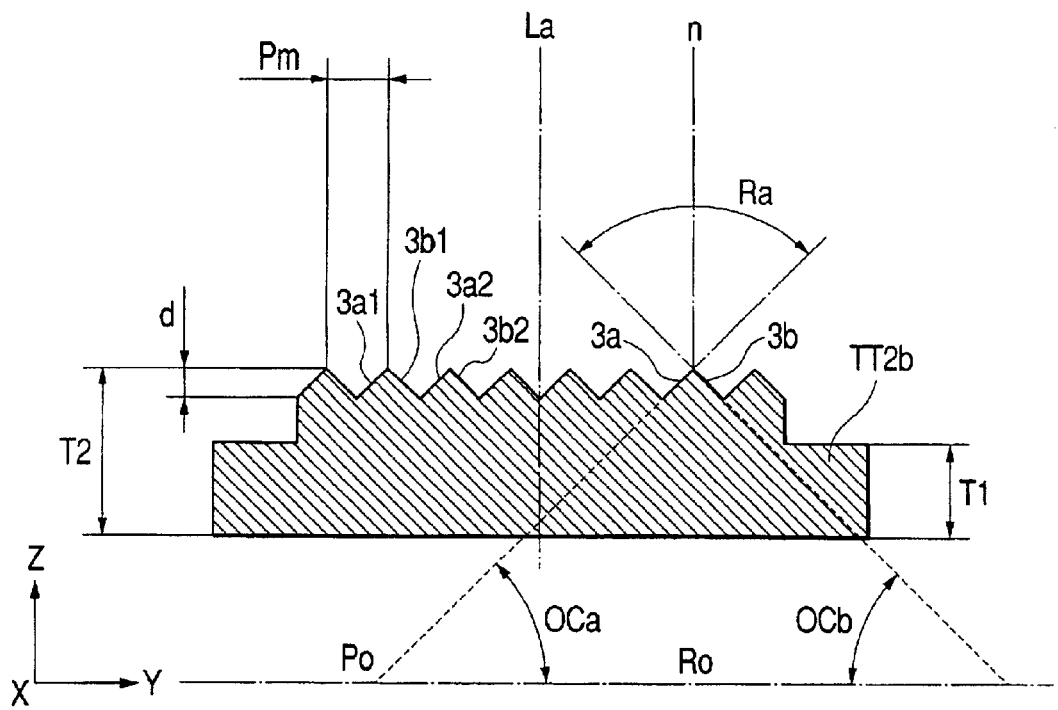
FIG. 24 is a sectional view taken along a line 24—24 of the linear encoder scale in FIG. 23A.
Figure 25:
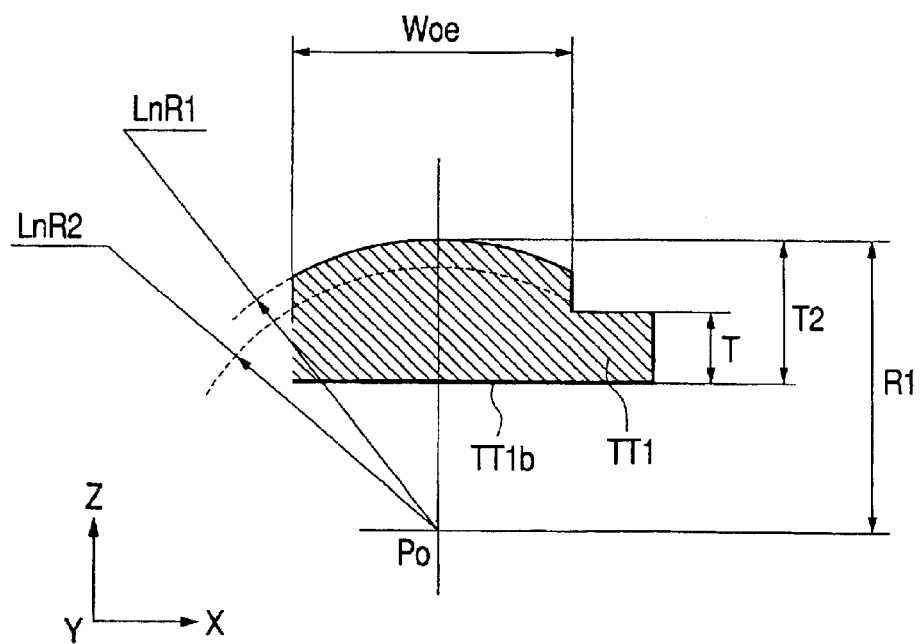
FIG. 25 is a sectional view taken along a line 25—25 of the linear encoder scale in FIG. 23A.

The characteristic features of the reflector 3 will be described with reference to a 24—24 cross section and 25—25 cross section in FIG. 23A, which are shown in FIGS. 24 and 25, respectively.

FIGS. 24 and 25 respectively show the 24—24 cross section and 25—25 cross section in FIG. 23A. A description of the same reference symbols and shape parameters as those in the preceding embodiments will be omitted.

Referring to FIG. 25, V-shaped groove groups are arrayed without any gap. However, a surface 3c (flat surface portion) (not shown) may exist between V-shaped groove groups. A light reaching this portion from a rear surface TT2b is transmitted through the portion without being totally reflected, and hence does not strike the light-receiving element portion on the encoder side.

The reflector 3 of this embodiment is not limited to a transparent member using a total internal reflecting action. For example, a reflection element having a two-dimensional reflection characteristic may be formed by forming V-shaped grooves by using a soft metal plate such as an aluminum plate and an inexpensive method such as a Px technique.

The characteristic features of a reflector using a reflection means having a two-dimensional convergence characteristic according to the present invention will be described below with reference to FIGS. 26A to 30 in comparison with a conventional reflector having a flat surface as a reflection surface on which an aluminum reflection film is formed.

Figure 26A:
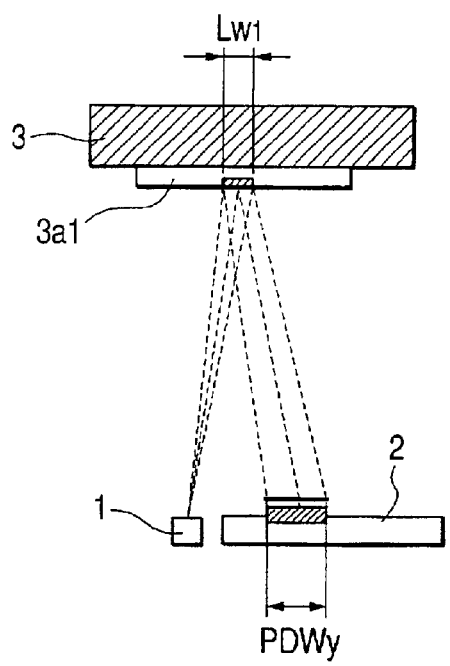
FIGS. 26A and 26B are views each showing the optical path of light reflected by a conventional reflector having an aluminum reflection film.
Figure 26B:
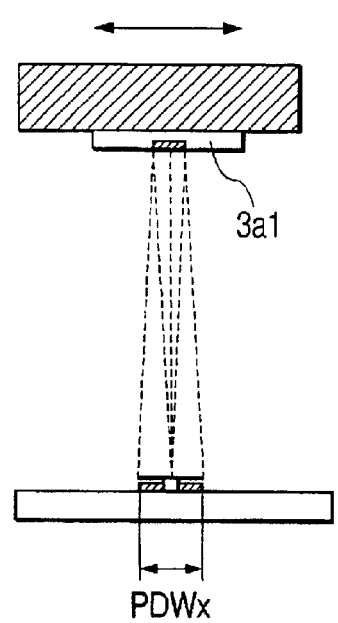

FIGS. 26A and 26B are views for explaining a conventional reflector 3 having a flat surface serving as a reflection surface on which an aluminum reflection film is formed. FIGS. 26A and 27B show the optical path of the light beam emitted from a light source 1 of a photosensor PS and guided to a light-receiving element 2 through a reflection surface 3a1 of the reflector 3. The arrangement shown in FIGS. 26A and 26B is comprised of the light source 1, the light-receiving element 2 having a size PDWy×PDWx, and the reflector 3 having the aluminum reflection film 3a1 formed on its surface. Referring to FIGS. 26A and 26B, the dotted lines indicate rays between the light source, reflector and light-receiving element. According to a geometrical relationship, a width Lw1 of a portion of the aluminum reflection film 3a1 which is irradiated with an effective light beam is Lw1=½PDWy. If the size of the light-receiving element 2 is 400 μm, the portion on the aluminum reflection surface is about 200 μm. That is, only a small amount of rays reach from the light source 1 to the light-receiving portion 2.

Figure 27A:
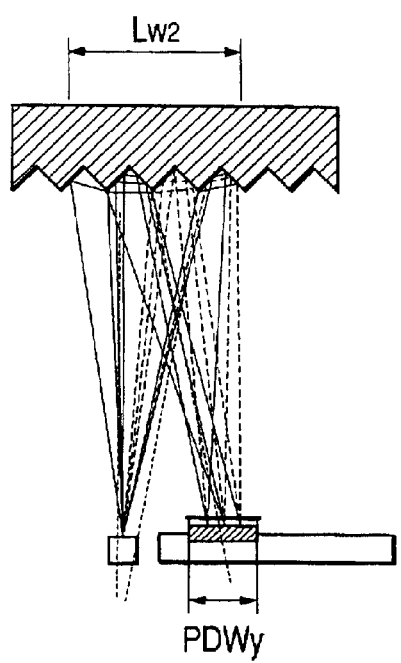
FIGS. 27A and 27B are views each showing the optical path of light reflected by a reflection target having the V-shaped grooves shown in FIGS. 21A and 21B.
Figure 27B:
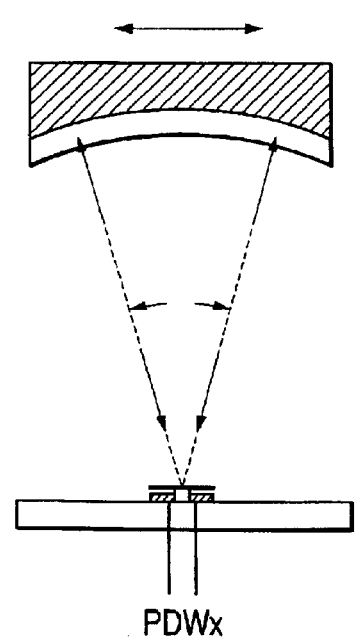

In this type of the reflector 3, the relationship between the gap (distance) between the photosensor Ps and the reflector 3 and the amount of light received by the light-receiving element 2 is expressed by light amount=1/(distance)$^2$ FIGS. 27A and 27B are schematic views showing rays in a case where a reflector 3 having a V-shaped groove reflection surface (reflection means having a one-dimensional convergence characteristic) according to the present invention is used. In the 12th embodiment described above, the total internal reflection of the transparent member is used. In this case, for the sake of simple explanation, this embodiment will be described by using a metal reflector in which V-shaped grooves exhibiting similar optical characteristics are formed. Referring to FIGS. 27A and 27B, a V-shaped groove surface is considered to have a reflectance equal to that of the above aluminum reflection film, and the angle (Ra) of each V-shaped groove is set to about 95° to form a similar ray path. A ray path from the side surface in FIG. 27B is identical to that in FIG. 26B.

Referring to FIG. 27A, however, the width Lw1 in FIG. 26A increases to Lw2 to guide a large amount of rays to the light-receiving of the photosensor PS.

Since the light source 1 is spaced apart from the light-receiving element 2, rays can be guided to a target light-receiving position by adjusting the angle Ra. In this case, since the angle Ra is set to about 95°, actual rays are guided not only to the light-receiving element 2 side but also to a position symmetrical to the light-receiving element 2 with respect to the light source 1 (rays 71 indicated by the dotted lines in FIG. 7B).

Figure 28A:
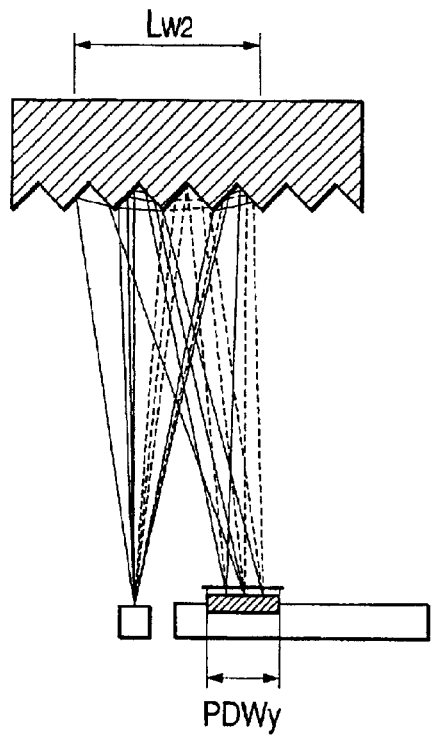
FIGS. 28A and 28B are views each showing the optical path of light reflected by the linear encoder reflection scale shown in FIGS. 22A and 22B.
Figure 28B:
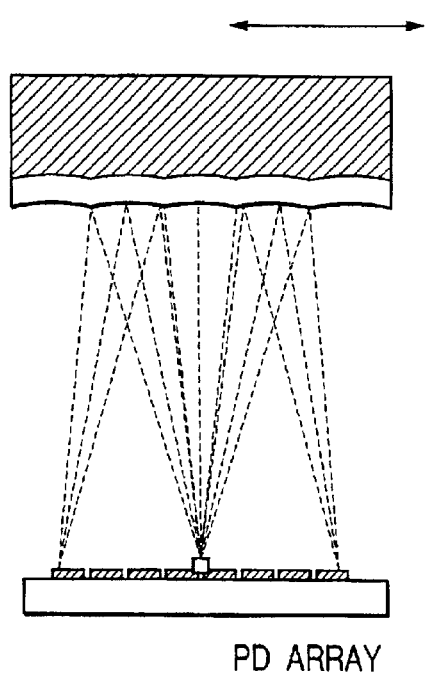

FIGS. 28A and 28B are schematic views showing a case where a reflector 3 having an array of many V-shaped groove groups similar to those in the 12th embodiment is used as a reflection scale for an encoder. FIGS. 28A and 28B schematically show how a ray from a light source 1 of a photosensor PS is guided to a light-receiving element 2 through the reflector 3. A description of this state is the same as that in FIGS. 27A and 27B, and hence a description thereof will be omitted.

In this case as well, as shown in FIGS. 26A and 26B, a larger amount of rays are guided to the light-receiving element 2 as compared with the conventional reflector 105 having the aluminum reflection film.

The reflection scale (reflector) of the present invention allows light from the reflector to be guided to the light-receiving portion more efficiently than a conventional reflection scale having a reflection film such as an aluminum film.

Figure 29A:
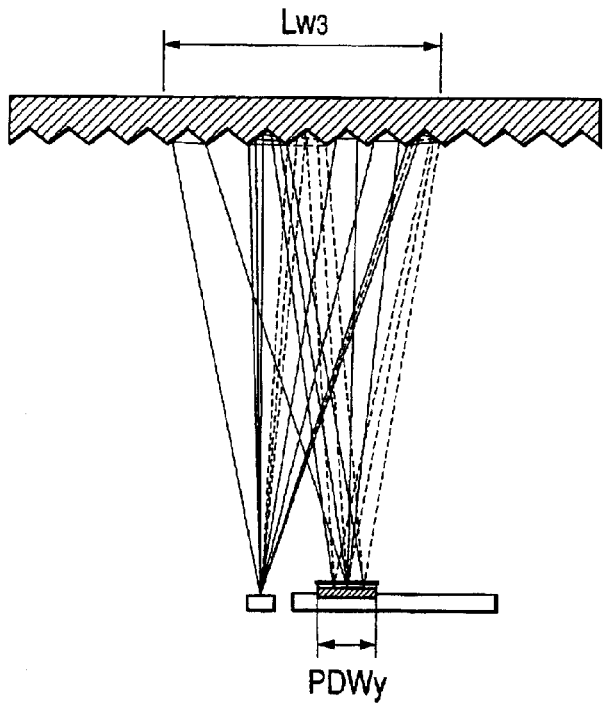
FIGS. 29A and 29B are views showing the gap characteristics of a reflection scale according to the present invention.
Figure 29B:
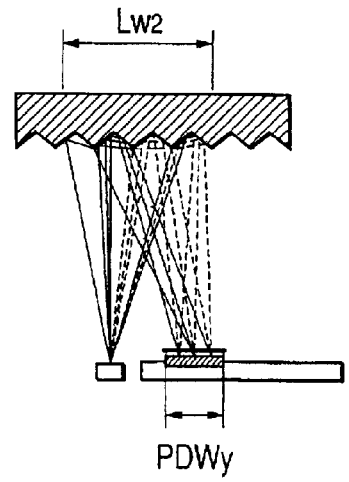
Figure 30:
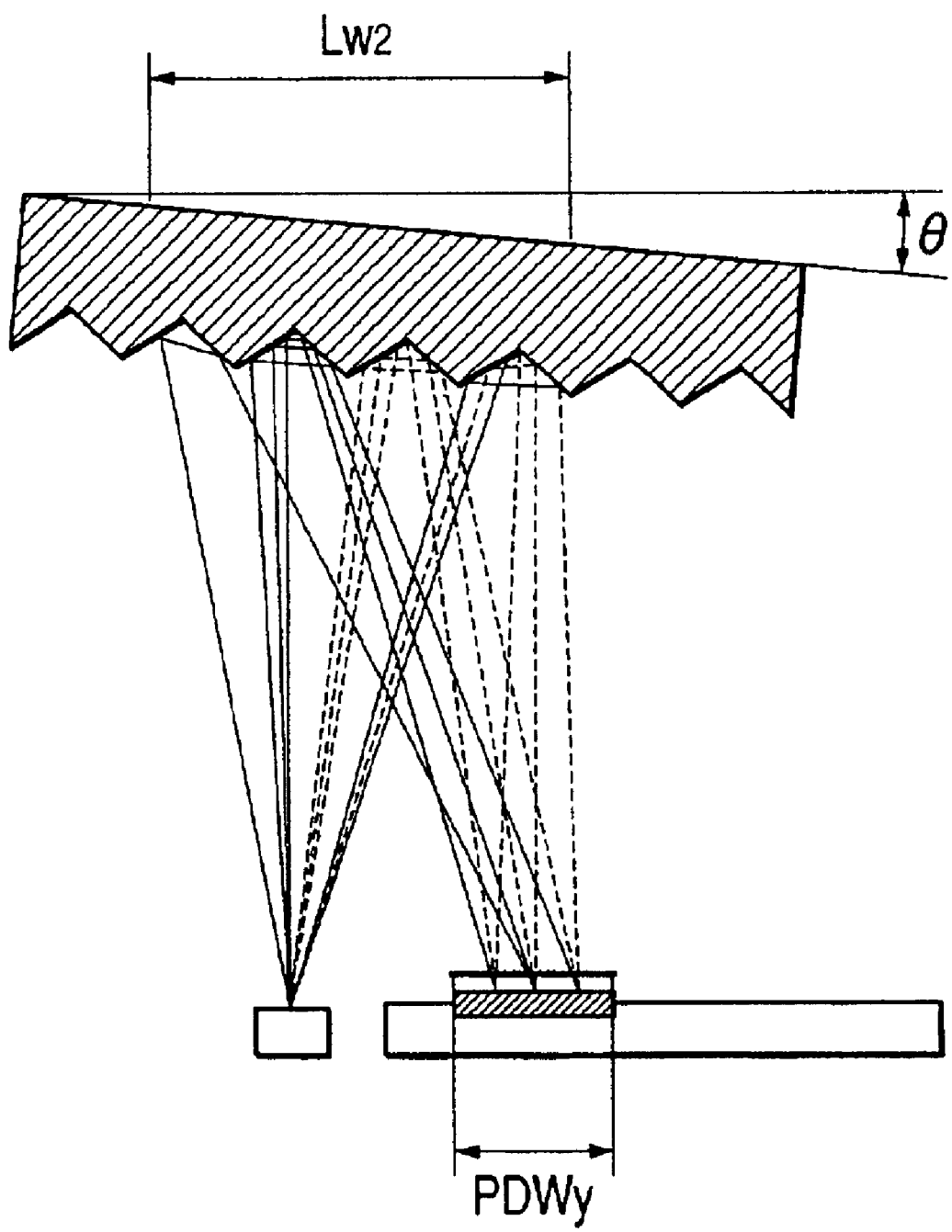
FIG. 30 is a view showing the tilt characteristics of a reflection scale according to the present invention.

FIGS. 29A and 29B are views for explaining an effect of the reflector of the present invention which is different from that described above. This effect is based on the performance of a so-called reflection-type encoder which is associated with the gap characteristics between a photosensor PS and a scale (reflector) 3. FIG. 29A shows a state where the photosensor PS and reflection scale 3 are spaced apart from a reference position. FIG. 29B shows a case where the distance between them is set to a standard reference distance. The light reception efficiency of this arrangement is the same as that in the first embodiment of the present invention FIG. 30 is a view for explaining another effect of the present invention.

This effect is based on the performance of a so-called reflection-type encoder which is associated with the relative tilt characteristics between a photosensor PS and a reflector 3. Even if the tilt (θ) of the reflection scale 3 of the present invention changes, rays guided from the reflector 3 to a light-receiving portion 2 are stable.

As described above, when the reflector 3 having the V-shaped grooves or V-shaped groove groups is used, the absolute amount of light guided to the light-receiving portion 2 of the photosensor PS becomes larger than that when the conventional reflector is used.

(14th Embodiment)

Figure 31A:
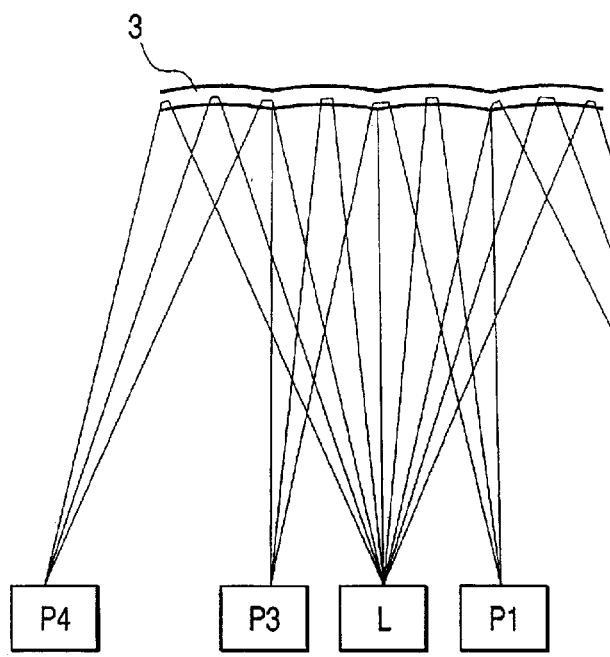
FIGS. 31A and 31B are views each showing the optical path of light reflected by a reflection scale according to the present invention.
Figure 31B:
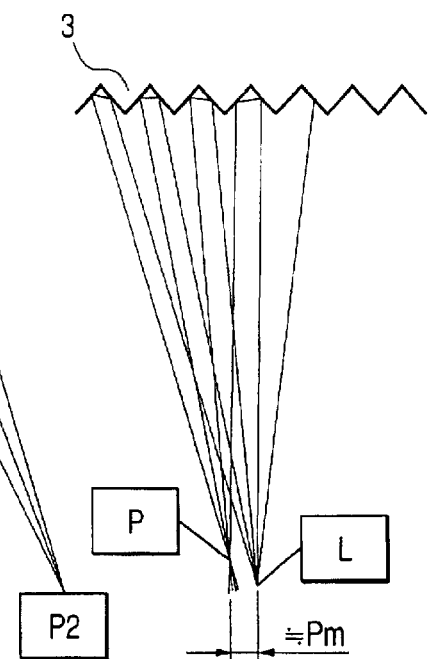

FIGS. 31A and 31B are views for explaining how light beams are focused on a plurality of positions (P1 to P4) when a plurality of V-shaped grooves or V-shaped groove groups each having an arcuated ridge are arrayed in a moving direction.

Figure 32A:
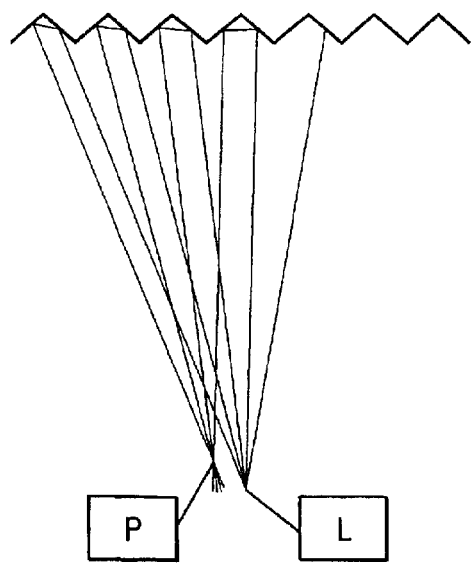
FIGS. 32A and 32B are views respectively showing the optical paths of light reflected by a reflection scale according to the present invention with and without an offset.
Figure 32B:
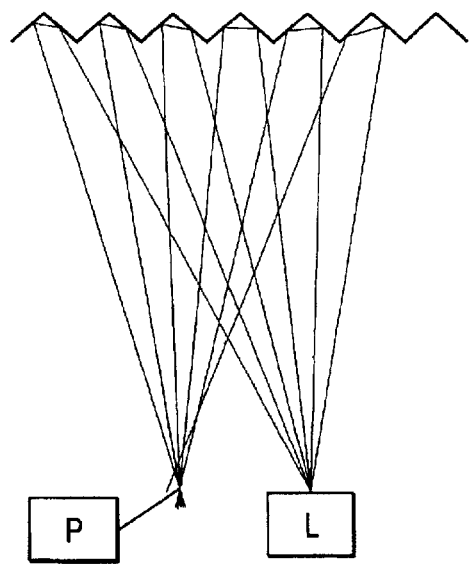
Figure 33:
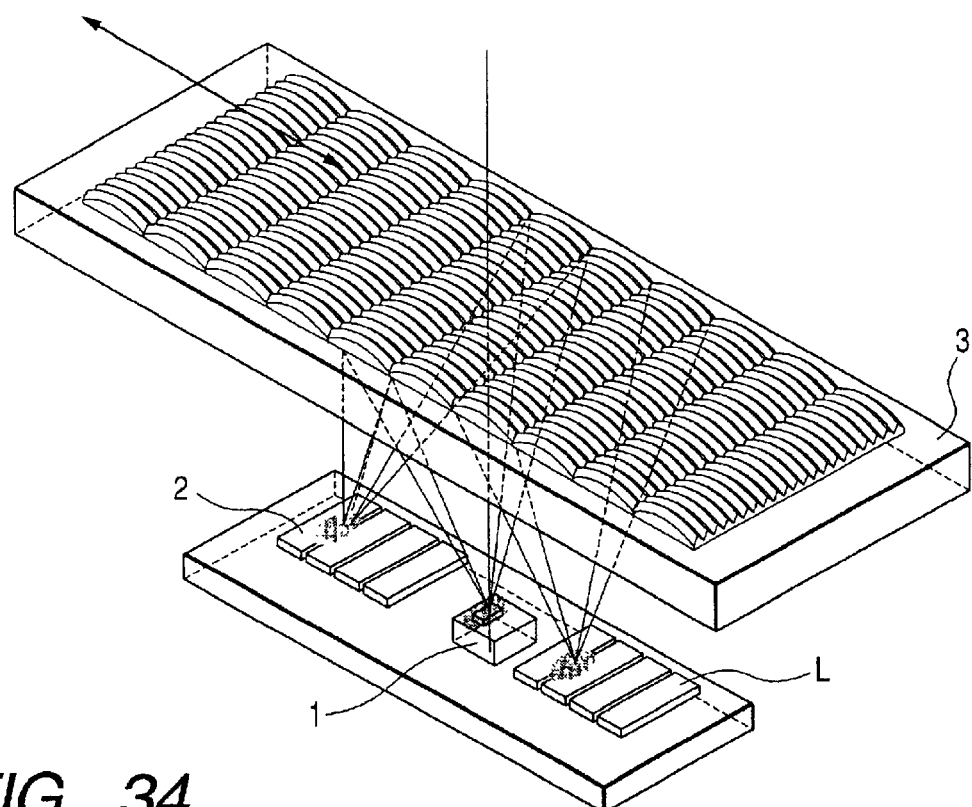
FIG. 33 is a perspective view showing the optical paths of light beams reflected by a reflection scale according to the present invention without an offset.
Figure 34:
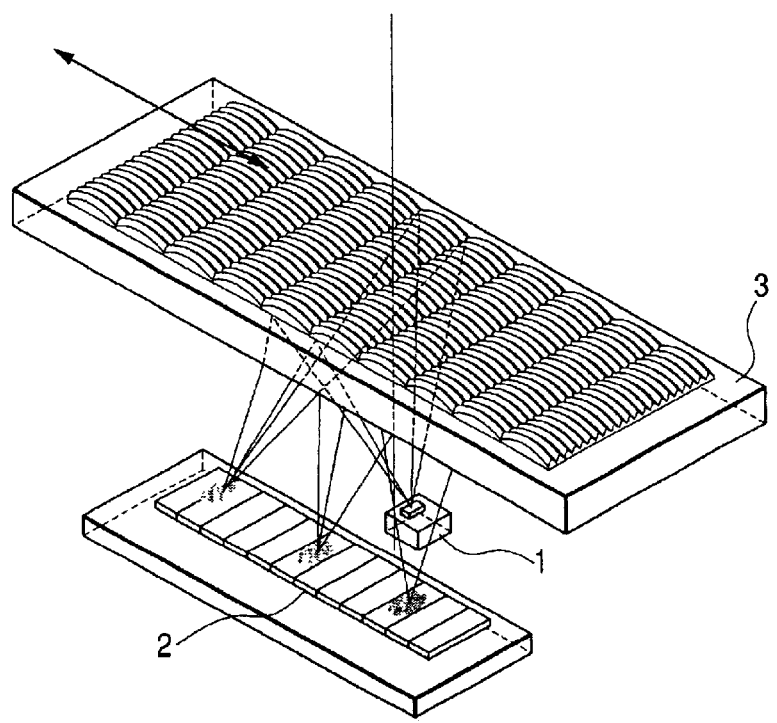
FIG. 34 is a perspective view showing the optical paths of light beams reflected by a reflection scale according to the present invention with an offset.

In the first embodiment, since the V-shaped grooves or V-shaped groove groups are arranged within a plane, a substantially nonreflection area must be provided. In contrast to this, in the 14th embodiment, the use efficiency is improved by allowing almost all light beams to be used. If the angle of each V-shaped groove or V-shaped groove group is changed, a focusing position P of a reflected light beam can be spaced apart from an emission position, as shown in FIGS. 32A and 32B. This makes it possible to properly set the positions of a light source 1 and light-receiving element 2, as shown in FIGS. 33 and 34.

The fourth to 10th embodiments may be combined with the 14th embodiment.

(15th Embodiment)

Figure 35:
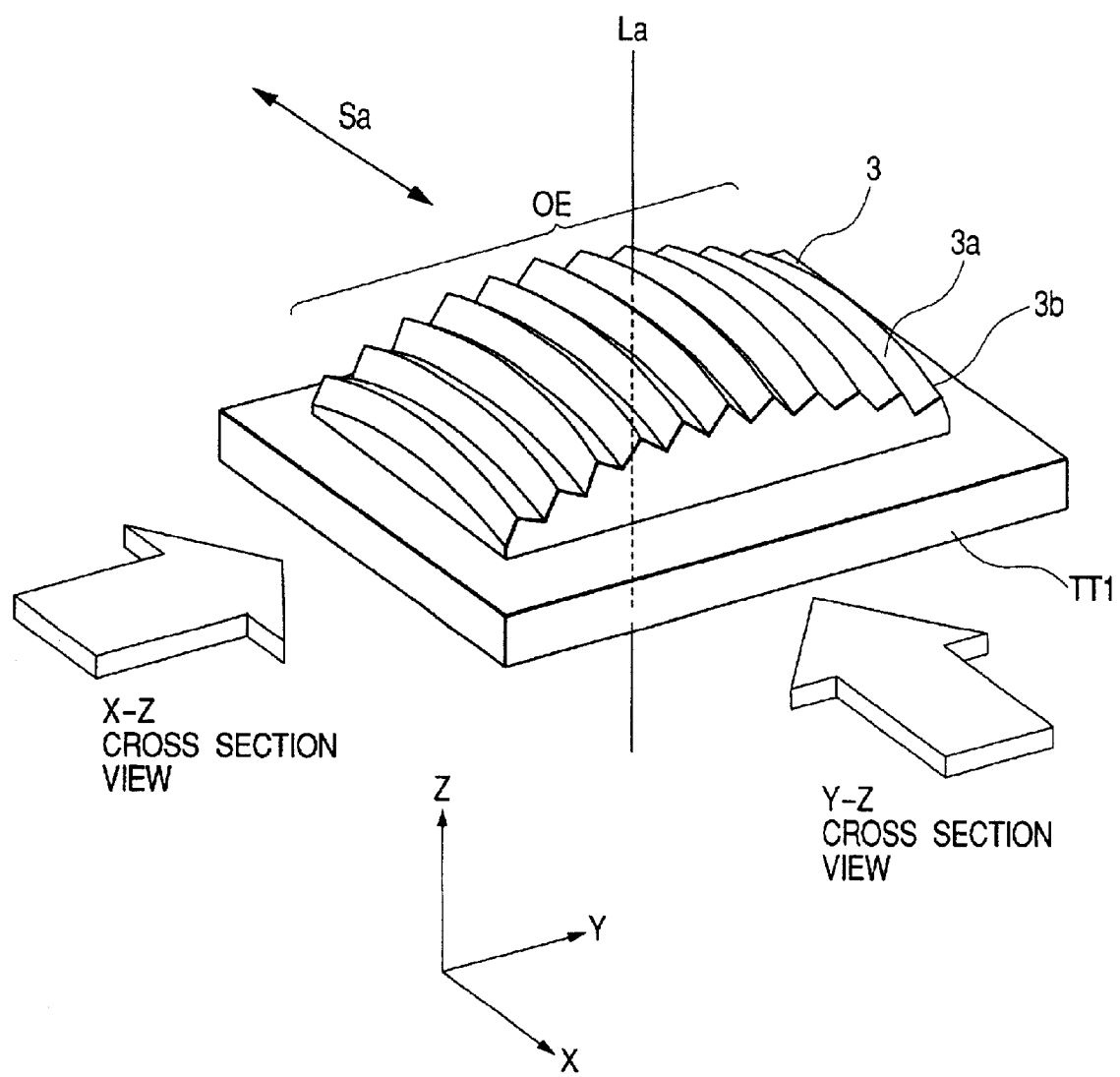
FIG. 35 is a perspective view showing a reflection scale according to still another embodiment of the present invention.
Figure 36:
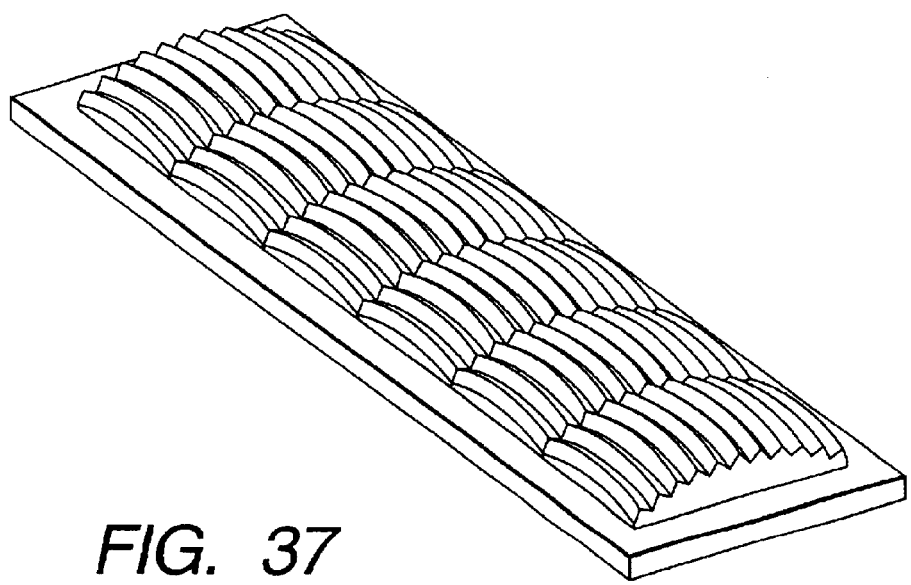
FIG. 36 is a perspective view showing a reflection scale according to still another embodiment of the present invention.
Figure 37:
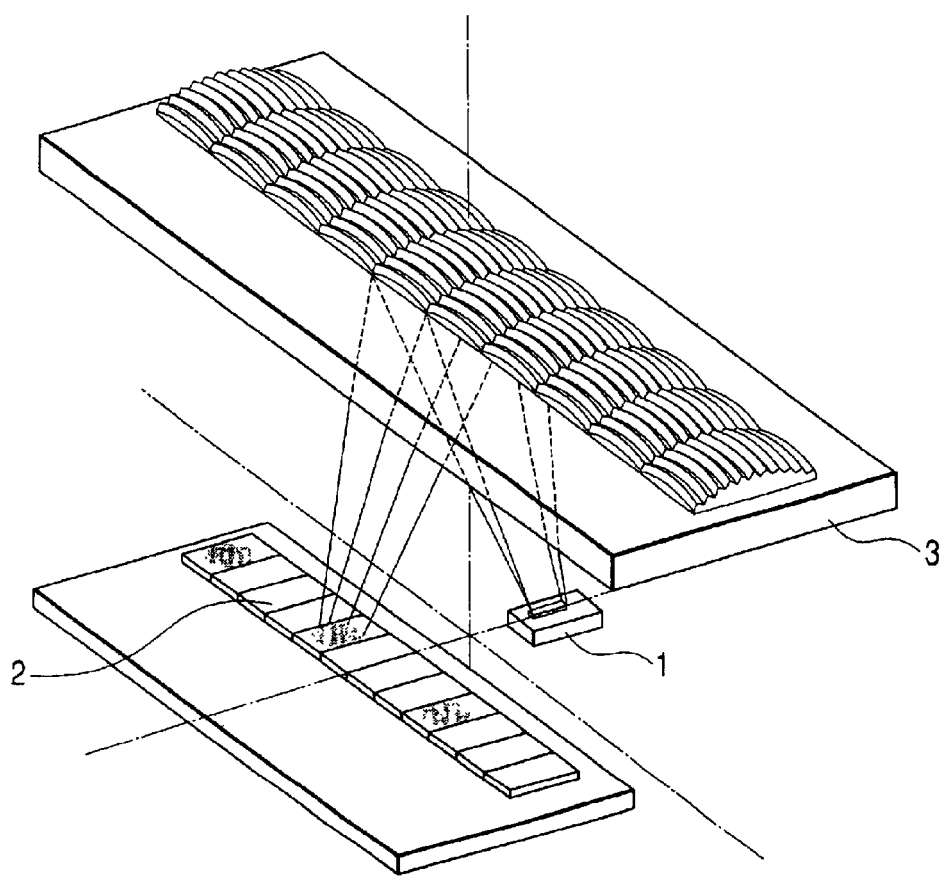
FIG. 37 is a perspective view showing an embodiment of the reflection scale in FIG. 36.

FIGS. 35, 36, and 37 show a linear encoder reflection scale according to the 14th embodiment, which is formed by a reflection element 3 having a two-dimensional convergence characteristic obtained by combining the reflection element having a one-dimensional convergence characteristic according to the present invention described with reference to FIG. 21A with the arrangement FIG. 14B according to the fourth embodiment. This embodiment has an ideal form with an envelope surface formed by a ridge of a V-shaped groove group substantially forming part of a spherical surface.

FIG. 36 shows a practical linear encoder reflection scale having an array of a plurality of arrangements each identical to that shown in FIG. 35. This embodiment has the effects based on the fifth embodiment shown in FIG. 14B in addition to the effects based on the 13th and 14th embodiments shown in FIGS. 21A and 31B. As is obvious from FIG. 37, a divergent light beam that is emitted from a light source and incident from a lower surface TT1 appropriately converges and is focused on the detection surface of a light-receiving element 2, thus improving the light reception efficiency.

It is preferable that the join portions between the respective reflection surfaces, reflection elements, and reflection element arrays in all the embodiments described above be substantially nonreflective.

What is claimed is:

1. A displacement detecting apparatus comprising:
   an illumination system which applies a divergent light beam from a light-emitting device to a reflection scale provided on a measurement object which relatively moves; and
   a light sensing device which detects an amount of a light beam reflected by said reflection scale,
   wherein said reflection scale has a portion which reflects the light beam applied by said illumination system at least twice so as to guide the light beam into said light sensing device, and has another portion which guides the light beam onto other than said light sensing device.

2. An apparatus according to claim 1, wherein said reflection scale has an optical function of wavefront-splitting the divergent light beam from said illumination system into a plurality of light beams and overlaying the plurality of wavefront-split light beams at a predetermined position.

3. An apparatus according to claim 1, wherein said reflection scale has an optical function of wavefront-splitting the divergent light beam from said illumination system into a plurality of light beams and overlaying the plurality of wavefront-split light beams on a detection surface of said light sensing device.

4. An apparatus according to claim 1, wherein said reflection scale is a roof type reflection element formed by opposing two reflection surfaces at a predetermined angle.

5. An apparatus according to claim 4, wherein said reflection scale has a plurality of roof type reflection elements, each identical to said roof type reflection element, arrayed in a predetermined direction.

6. An apparatus according to claim 5, wherein said reflection scale having said plurality of roof type reflection elements, each identical to said roof type reflection element, arrayed in the predetermined direction is formed by a metal reflection surface, and a reflection area thereof is a surface reflection type mirror.

7. An apparatus according to claim 5, wherein said reflection scale having said plurality of roof type reflection elements, each identical to said roof type reflection element, arrayed in the predetermined direction is formed by a metal reflection surface, and a reflection area thereof is a surface reflection.

8. An apparatus according to claim 7, wherein said reflection scale having said plurality of roof type reflection elements, each identical to said roof type reflection element, arrayed in the predetermined direction is an internal reflection type mirror made of a transparent material, and has cylindrical surfaces on the light beam incident and exit surface sides.

9. An apparatus according to claim 5, wherein said reflection scale having said plurality of roof type reflection elements, each identical to said roof type reflection element, arrayed in the predetermined direction is formed such that all angles defined by reflection surfaces are equal to each other.

10. An apparatus according to claim 5, wherein said reflection scale having said plurality of roof type reflection elements, each identical to said roof type reflection element, arrayed in the predetermined direction is formed such that angles defined by reflection surfaces continuously increase/decrease from a central portion to a peripheral portion in an array direction of said roof type reflection elements in said reflection scale.

11. An apparatus according to claim 5, wherein said reflection scale has a plurality of roof type reflection elements, each identical to said roof type reflection element, discontinuously arrayed in a moving direction.

12. An apparatus according to claim 11, wherein said reflection scale has a plurality of roof type reflection elements, each identical to said roof type reflection element, discontinuously arrayed in a moving direction, and a discontinuous portion has a substantially nonreflection characteristic.

13. An apparatus according to claim 4, wherein said reflection scale is formed such that a ridge formed by joining surfaces of said roof type reflection elements forms part of an arc or ellipse.

14. An apparatus according to claim 13, wherein said reflection scale having said plurality of roof type reflection elements, each identical to said roof type reflection element, arrayed in the predetermined direction is formed by a metal reflection surface, and a reflection area thereof is a surface reflection type mirror.

15. An apparatus according to claim 13, wherein said reflection scale having said plurality of roof type reflection elements, each identical to said roof type reflection element, arrayed in the predetermined direction is formed by a metal reflection surface, and a reflection area thereof is a rear surface reflection type mirror.

16. An apparatus according to claim 15, wherein said reflection scale having said plurality of roof type reflection elements, each identical to said roof type reflection element, arrayed in the predetermined direction is an internal reflection type mirror made of a transparent material, and has cylindrical surfaces on the light beam incident and exit surface sides.

17. An apparatus according to claim 13, wherein said reflection scale having said plurality of roof type reflection elements, each identical to said roof type reflection element, arrayed in the predetermined direction is formed such that all angles defined by reflection surfaces are equal to each other.

18. An apparatus according to claim 13, wherein said reflection scale having said plurality of roof type reflection elements, each identical to said roof type reflection element, arrayed in the predetermined direction is formed such that angles defined by reflection surfaces continuously increase/decrease from a central portion to a peripheral portion in an array direction of said roof type reflection elements in said reflection scale.

19. An apparatus according to claim 13, wherein said reflection scale has a plurality of roof type reflection elements, each identical to said roof type reflection element, discontinuously arrayed in a moving direction.

20. An apparatus according to claim 19, wherein said reflection scale has a plurality of roof type reflection elements, each identical to said roof type reflection element, discontinuously arrayed in a moving direction, and a discontinuous portion has a substantially nonreflection characteristic.

21. An apparatus according to claim 4, wherein said reflection scale is formed such that an envelope surface formed by ridges formed by joining surfaces of said roof type reflection elements forms part of a spherical surface.

22. An apparatus according to claim 21, wherein said reflection scale having said plurality of roof type reflection elements, each identical to said roof type reflection element, arrayed in the predetermined direction is formed by a metal reflection surface, and a reflection area thereof is a surface reflection type mirror.

23. An apparatus according to claim 21, wherein said reflection scale having said plurality of roof type reflection elements, each identical to said roof type reflection element, arrayed in the predetermined direction is formed by a metal reflection surface, and a reflection area thereof is a surface reflection.

24. An apparatus according to claim 21, wherein said reflection scale having said plurality of roof type reflection elements, each identical to said roof type reflection element, arrayed in the predetermined direction is an internal reflection type mirror made of a transparent material, and has cylindrical surfaces on the light beam incident and exit surface sides.

25. An apparatus according to claim 21, wherein said reflection scale having said plurality of roof type reflection elements, each identical to said roof type reflection element, arrayed in the predetermined direction is formed such that all angles defined by reflection surfaces are equal to each other.

26. An apparatus according to claim 25, wherein said reflection scale having said plurality of roof type reflection elements, each identical to said roof type reflection element, arrayed in the predetermined direction is formed such that angles defined by reflection surfaces continuously increase/decrease from a central portion to a peripheral portion in an array direction of said roof type reflection elements in said reflection scale.

27. An apparatus according to claim 21, wherein said reflection scale has a plurality of roof type reflection elements, each identical to said roof type reflection element, discontinuously arrayed in a moving direction.

28. An apparatus according to claim 27, wherein said reflection scale has a plurality of roof type reflection elements, each identical to said roof type reflection element, discontinuously arrayed in a moving direction, and a discontinuous portion has a substantially nonreflection characteristic.

* * * * *

UNITED STATES PATENT AND TRADEMARK OFFICE
CERTIFICATE OF CORRECTION

PATENT NO. : 6,975,408 B2  
DATED : December 13, 2005  
INVENTOR(S) : Igaki et al.

It is certified that error appears in the above-identified patent and that said Letters Patent is hereby corrected as shown below:

Title page,
Item [56], References Cited, U.S. PATENT DOCUMENTS, insert
-- 3,598,493 A       08/1971     Fisher
   2003/0047674 A1  03/2003     Thornburn et al.
   2003/0218125 A1  11/2003     Igaki et al. --.

Column 6,
Line 26, after "FIG. 12;" insert -- and --.
Line 28, "encoder; and" should be -- encoder. --.

Column 12,
Line 32, "Ra=95`" should be -- Ra=95o --.

Column 13,
Line 49, "(11th Embodiment)" should be its own paragraph.

Signed and Sealed this

Twenty-fifth Day of April, 2006

JON W. DUDAS  
*Director of the United States Patent and Trademark Office*